(12) United States Patent
Itadani

(10) Patent No.: US 9,151,389 B2
(45) Date of Patent: Oct. 6, 2015

(54) SLIDING COMPONENT

(71) Applicant: EAGLE INDUSTRY CO., LTD., Minato-ku, Tokyo (JP)

(72) Inventor: Masatoshi Itadani, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/419,443

(22) PCT Filed: Dec. 4, 2013

(86) PCT No.: PCT/JP2013/082535
§ 371 (c)(1),
(2) Date: Feb. 3, 2015

(87) PCT Pub. No.: WO2014/103630
PCT Pub. Date: Jul. 3, 2014

(65) Prior Publication Data
US 2015/0226334 A1    Aug. 13, 2015

(30) Foreign Application Priority Data

Dec. 25, 2012    (JP) ................. 2012-280647

(51) Int. Cl.
*F16J 15/40* (2006.01)
*F16J 15/34* (2006.01)
*F16J 15/16* (2006.01)

(52) U.S. Cl.
CPC .............. *F16J 15/342* (2013.01); *F16J 15/162* (2013.01)

(58) Field of Classification Search
CPC ........ F16J 15/34; F16J 15/344; F16J 15/3408; F16J 15/3412
See application file for complete search history.

(56) References Cited

U.S. PATENT DOCUMENTS

| 5,498,007 A | 3/1996 | Kulkarni et al. |
| 5,501,470 A | 3/1996 | Fuse et al. |
| 6,446,976 B1 | 9/2002 | Key et al. |
| 2013/0209011 A1* | 8/2013 | Tokunaga ................. 384/123 |

FOREIGN PATENT DOCUMENTS

| JP | S57-146955 A | 9/1982 |
| JP | S64-049771 A | 2/1989 |
| JP | H01-133572 U | 9/1989 |

(Continued)

OTHER PUBLICATIONS

International Search Report (ISR), mailed Mar. 11, 2014, issued for International Application No. PCT/JP2013/082535.

*Primary Examiner* — Gilbert Lee
(74) *Attorney, Agent, or Firm* — Law Office of Katsuhiro Arai

(57) ABSTRACT

A sliding component is characterized in that: with respect to a pair of sliding parts that slide relative to each other, one sealing face has a fluid circulation groove including an inlet through which fluid enters from the high-pressure fluid side, an outlet through which fluid is released to the high-pressure fluid side, and a communicating part through which the inlet and outlet communicate with each other; wherein the fluid circulation groove is isolated from the low-pressure fluid side by a land, a positive-pressure generation mechanism is provided in the area surrounded by the fluid circulation groove and high-pressure fluid side, and the positive-pressure generation mechanism communicates with the inlet and is isolated from the outlet and high-pressure fluid side by a land.

20 Claims, 14 Drawing Sheets

(56) References Cited

FOREIGN PATENT DOCUMENTS

| JP | H04-017570 U | 2/1992 |
| JP | H04-101077 U | 9/1992 |
| JP | H07-035242 A | 2/1995 |
| JP | H07-180772 A | 7/1995 |
| JP | H07-224948 A | 8/1995 |
| WO | WO 2012046749 A1 * | 4/2012 |

* cited by examiner

High-pressure fluid side
(sealed fluid side)

Low-pressure fluid side
(atmosphere side)

SLIDING COMPONENT

This application is the U.S. National Phase under 35 U.S.C. §371 of International Application PCT/JP2013/082535, filed Dec. 4, 2013, which claims priority to Japanese Patent Application No. 2012-280647, filed Dec. 25, 2012. The International Application was published under PCT Article 21(2) in a language other than English.

TECHNICAL FIELD

The present invention relates to a sliding component suitable for mechanical seals, bearings and other sliding areas. In particular, the present invention relates to a seal ring, bearing, or other sliding component that must reduce friction by allowing a fluid to be present between the sealing faces, while preventing the fluid from leaking out of the sealing faces.

BACKGROUND ART

The performance of a mechanical seal, which is an example of a sliding component, is evaluated based on the leakage rate, wear rate, and torque. Mechanical seals of prior arts have achieved greater performance in the form of low leakage, long life, and low torque by optimizing their sealing material and roughness of seal area. In recent years, however, the ever-growing awareness of environmental issues in the market has created a demand for mechanical seals offering even higher performance and a consequent need to develop technologies that go beyond the scope of prior arts.

Under the circumstances, the inventor of the present invention has shown that, in the case of mechanical seals for water pumps used to cool water-cooled engines, for example, additives for LLC (long-life coolant), which is a type of antifreeze agent, such as silicate and phosphate (hereinafter referred to as "causative substances for deposits"), may accumulate on the sealing face over time to generate deposits that can cause mechanical sealing properties to drop. This generation of deposits is a phenomenon that also occurs with mechanical seals for equipment handling chemicals and oils.

Known among conventional mechanical seals are those having fluid introduction grooves, which are formed on their sealing face in order to form a fluid layer and thereby prevent wear and burn damage that would otherwise be caused by generation of frictional heat on the sealing face (refer to Patent Literatures 1, 2 and 3, for example), but the present reality is that none of them provides a measure to reduce leakage or wear, not to mention preventing generation of deposits on the sealing face.

PRIOR ART LITERATURES

Patent Literatures

Patent Literature 1: Japanese Patent Laid-open No. Hei 7-180772
Patent Literature 2: Japanese Patent Laid-open No. Hei 7-224948
Patent Literature 3: U.S. Pat. No. 5,498,007

SUMMARY OF INVENTION

Problems To Be Solved By Invention

An object of the present invention is to provide a sliding component that actively takes fluid to the sealing face and discharges it from the sealing face while satisfying the mutually exclusive conditions of sealing and lubricating, thereby preventing causative substances for deposits from accumulating on the sealing face and thus preventing deposits from generating, so that the sealing face will be able to maintain its sealing function for an extended period of time.

Means for Solving the Problems

To achieve the aforementioned object, firstly the sliding component proposed by the present invention is characterized in that: with respect to a pair of sliding parts that slide relative to each other, one sealing face has a fluid circulation groove comprising an inlet through which fluid enters from the high-pressure fluid side, an outlet through which fluid is released to the high-pressure fluid side, and a communicating part through which the inlet and outlet communicate with each other; wherein the fluid circulation groove is isolated from the low-pressure fluid side by a land, a positive-pressure generation mechanism is provided in the area surrounded by the fluid circulation groove and high-pressure fluid side, and the positive-pressure generation mechanism communicates with the inlet and is isolated from the outlet and high-pressure fluid side by a land.

According to these features, fluid is circulated through the sealing face in that it is actively taken into the sealing face by the fluid circulation groove and then discharged from the sealing face, thereby preventing causative substances for deposits from accumulating on the sealing face and thus preventing deposits from generating on the sealing face, while at the same time the positive-pressure generation mechanism is used to increase the fluid film between the sealing faces to improve the lubrication performance, whereas the land is used to seal fluid, the result of which is that a sliding component is provided that satisfies the mutually exclusive conditions of sealing and lubricating while preventing deposits from generating on the sealing face.

In addition, secondly, the sliding component proposed by the present invention is characterized that, with regard to the first features, the fluid circulation groove is provided at multiple locations, each isolated by a land, in the circumferential direction on the sealing face.

According to these features, fluid can be taken in uniformly across the sealing face.

In addition, thirdly, the sliding component proposed by the present invention is characterized in that, with regard to the first or second features, the positive-pressure generation mechanism is constituted by a Rayleigh step mechanism.

According to these features, the positive-pressure generation mechanism can be formed with ease by providing a Rayleigh step on the sealing face.

In addition, fourthly, the sliding component proposed by the present invention is characterized in that, with regard to any of the first through third features, a spiral groove that discharges fluid to the high-pressure fluid side by means of relative sliding of the sliding parts is provided on the outside of the area of the one sealing face surrounded by the fluid circulation groove and high-pressure fluid side, and in that the spiral groove communicates with the high-pressure fluid side and is isolated from the low-pressure fluid side by a land.

According to these features, sealed fluid that would otherwise leak to the low-pressure fluid side from the high-pressure fluid side between the adjacent fluid circulation grooves where the positive-pressure generation mechanism is not provided, is pushed back to the high-pressure fluid side so as to improve sealing property, or specifically the sealing property of the sealing face as a whole. Moreover, since the spiral groove is isolated from the low-pressure fluid side by a land, fluid does not leak in a stationary state.

In addition, fifthly, the sliding component proposed by the present invention is characterized in that, with regard to any of the first through third features, a spiral groove that discharges fluid to the high-pressure fluid side by means of relative sliding of the sliding parts is provided on the outside of the area of the one sealing face surrounded by the fluid circulation groove and high-pressure fluid side, and in that the spiral groove communicates with the high-pressure fluid side and low-pressure fluid side.

According to these features, sealed fluid that would otherwise leak to the low-pressure fluid side from the high-pressure fluid side between the adjacent fluid circulation grooves where the positive-pressure generation mechanism is not provided, is pushed back to the high-pressure fluid side so as to improve sealing property, or specifically the sealing property of the sealing face as a whole. Moreover, since the spiral groove also communicates with the low-pressure fluid side, there is a benefit of vaporous cavitation not occurring easily on the low-pressure side of the spiral groove.

In addition, sixthly, the sliding component proposed by the present invention is characterized in that, with regard to any of the first through third features, a negative-pressure generation mechanism constituted by a negative-pressure generation groove shallower than the fluid circulation groove is provided on the outside of the area of the one sealing face surrounded by the fluid circulation groove and high-pressure fluid side, and in that the negative-pressure generation groove communicates with the inlet and is isolated from the outlet and low-pressure fluid side by a land.

According to these features, sealed fluid that would otherwise leak to the low-pressure fluid side from the high-pressure fluid side between the adjacent fluid circulation grooves in the area where the Rayleigh step mechanism is not provided, is taken into the negative-pressure generation groove and then returned to the high-pressure fluid side via the fluid circulation groove so as to improve sealing property, or specifically the sealing property of the sealing face as a whole.

In addition, seventhly, the sliding component proposed by the present invention is characterized in that, with regard to the sixth features, the negative-pressure generation mechanism is constituted by a reversed Rayleigh step mechanism.

According to these features, the negative-pressure generation mechanism can be formed with ease by providing a reversed Rayleigh step on the sealing face.

In addition, eighthly, the sliding component proposed by the present invention is characterized in that, with regard to any of the first through third, sixth, and seventh features, a spiral groove that discharges fluid to the high-pressure fluid side by means of relative sliding of the sliding parts is provided on the other sealing face of the pair of sliding parts that slide relative to each other, and in that the spiral groove communicates with the high-pressure fluid side and is isolated from the low-pressure fluid side by a land.

According to these features, particularly because the spiral groove is provided on a sealing face different from the one having the fluid circulation groove, positive-pressure generation mechanism, and/or negative-pressure generation mechanism, machining becomes easy and, since the spiral groove can be provided successively along the entire circumference, sealing property can be improved further.

In addition, ninthly, the sliding component proposed by the present invention is characterized in that, with regard to any of the first through third, sixth, and seventh features, a spiral groove that discharges fluid to the high-pressure fluid side by means of relative sliding of the sliding parts is provided on the other sealing face of the pair of sliding parts that slide relative to each other, and in that the spiral groove communicates with the high-pressure fluid side and low-pressure fluid side.

According to these features, particularly because the spiral groove is provided on a sealing face different from the one having the fluid circulation groove, positive-pressure generation mechanism and/or negative-pressure generation mechanism machining becomes easy and, since the spiral groove can be provided successively along the entire circumference, sealing property can be improved further.

In addition, tenthly, the sliding component proposed by the present invention is characterized in that: with respect to a pair of sliding parts that slide relative to each other, one sealing face has a fluid circulation groove comprising an inlet through which fluid enters from the high-pressure fluid side, an outlet through which fluid is released to the high-pressure fluid side, and a communicating part through which the inlet and outlet communicate with each other; wherein the fluid circulation groove is isolated from the low-pressure fluid side by a land, a positive-pressure generation mechanism is provided in the area surrounded by the fluid circulation groove and high-pressure fluid side, the positive-pressure generation mechanism communicates with the inlet, a spiral groove that discharges fluid to the high-pressure fluid side by means of relative sliding of the sliding parts is provided on the outside of the area surrounded by the fluid circulation groove and high-pressure fluid side and between the positive-pressure generation mechanism and the outlet and high-pressure fluid side, the spiral groove is isolated from the low-pressure fluid side by a land, and the surface on which the spiral groove is provided is set lower than the land and higher than the positive-pressure generation groove.

According to these features, particularly because the surface on which the spiral groove that discharges fluid to the high-pressure fluid side is set lower than the land, the fluid film in this area becomes thick and wear can be reduced as a result.

Effects of Invention

The present invention achieves excellent effects as described below.

(1) Fluid is circulated through the sealing face in that it is actively taken to the sealing face by the fluid circulation groove and then discharged from the sealing face, thereby preventing causative substances for deposits from accumulating on the sealing face and thus preventing deposits from generating on the sealing face, while at the same time the positive-pressure generation mechanism is used to increase the fluid film between the sealing faces to improve the lubrication performance, whereas the land is used to seal fluid, the result of which is that a sliding component is provided that satisfies the mutually exclusive conditions of sealing and lubricating while preventing deposits from generating on the sealing face.

(2) The fluid circulation groove is provided at multiple locations, each isolated by a land, in the circumferential direction on the sealing face, and accordingly fluid can be taken in uniformly across the sealing face.

(3) The positive-pressure generation mechanism is constituted by a Rayleigh step mechanism, and accordingly the positive-pressure generation mechanism can be formed with ease by providing a Rayleigh step on the sealing face.

(4) A spiral groove that discharges fluid to the high-pressure fluid side by means of relative sliding of the sliding parts is provided on the outside of the area surrounded by the fluid circulation groove and high-pressure fluid side, and the spiral groove communicates with the high-pressure fluid side and is isolated from the low-pressure fluid side by a land, and accordingly sealed fluid that would otherwise leak to the low-pressure fluid side from the high-pressure fluid side between the adjacent fluid circulation grooves where the positive-pressure generation mechanism is not provided, is pushed back to the high-pressure fluid side so as to improve sealing property, or specifically the sealing property of the sealing face as a whole. Moreover, since the spiral groove is isolated from the low-pressure fluid side by a land, fluid does not leak in a stationary state.

(5) A spiral groove that discharges fluid to the high-pressure fluid side by means of relative sliding of the sliding parts is provided on the outside of the area surrounded by the fluid circulation groove and high-pressure fluid side, and the spiral groove communicates with the high-pressure fluid side and low-pressure fluid side, and accordingly sealed fluid that would otherwise leak to the low-pressure fluid side from the high-pressure fluid side between the adjacent fluid circulation grooves where the positive-pressure generation mechanism is not provided, is pushed back to the high-pressure fluid side so as to improve sealing property, or specifically the sealing property of the sealing face as a whole. Moreover, since the spiral groove also communicates with the low-pressure fluid side, there is a benefit of vaporous cavitation not occurring easily on the low-pressure side of the spiral groove.

(6) A negative-pressure generation mechanism constituted by a negative-pressure generation groove shallower than the fluid circulation groove is provided on the outside of the area surrounded by the fluid circulation groove and high-pressure fluid side, and the negative-pressure generation groove communicates with the inlet and is isolated from the outlet and low-pressure fluid side by a land, and accordingly sealed fluid that would otherwise leak to the low-pressure fluid side from the high-pressure fluid side between the adjacent fluid circulation grooves in the area where the Rayleigh step mechanism is not provided, is taken into the negative-pressure generation groove and then returned to the high-pressure fluid side via the fluid circulation groove so as to improve sealing property, or specifically the sealing property of the sealing face as a whole.

(7) The negative-pressure generation mechanism is constituted by a reversed Rayleigh step mechanism, and accordingly the negative-pressure generation mechanism can be formed with ease by providing a reversed Rayleigh step on the sealing face.

(8) A spiral groove that discharges fluid to the high-pressure fluid side by means of relative sliding of the sliding parts is provided on the other sealing face of the pair of sliding parts that slide relative to each other, and accordingly, particularly because the spiral groove is provided on a sealing face different from the one having the fluid circulation groove, positive-pressure generation mechanism, and/or negative-pressure generation mechanism, machining becomes easy and, since the spiral groove can be provided successively along the entire circumference, sealing property can be improved further.

(9) The surface on which the spiral groove is provided is set lower than the land and higher than the positive-pressure generation groove, and accordingly the fluid film in the area where the spiral groove is provided becomes thick and wear can be reduced as a result.

MODES FOR CARRYING OUT THE INVENTION

Figure 1:
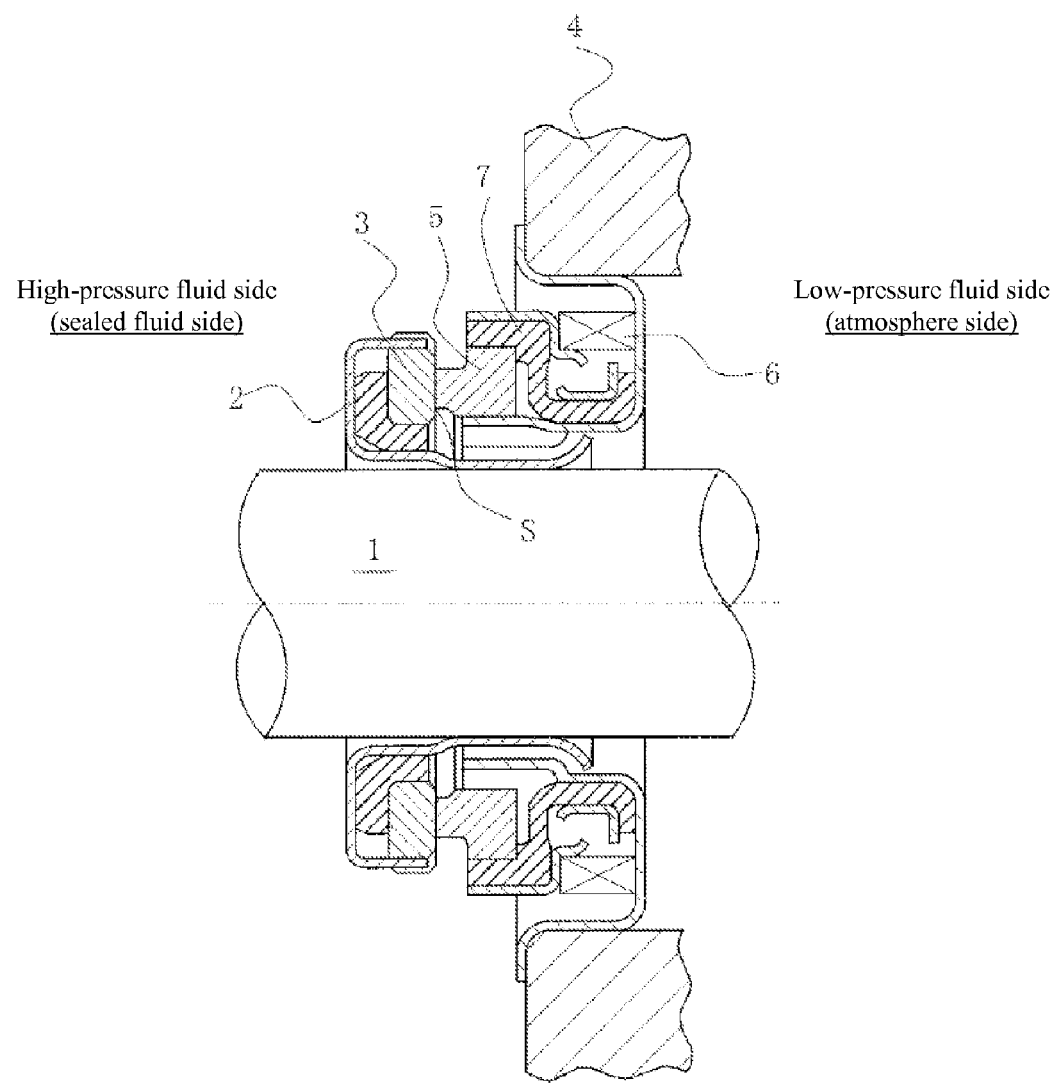
FIG. 1 is a longitudinal section view showing an example of a mechanical seal pertaining to Example 1 of the present invention.

Modes for carrying out the present invention are explained below based on examples by referring to the drawings. Note, however, that the dimensions, materials, shapes, and relative positions of components, etc. stated in these examples are not intended to limit the scope of the present invention to such dimensions, materials, shapes, and relative positions, unless expressly stated otherwise.

Example 1

Figure 2:
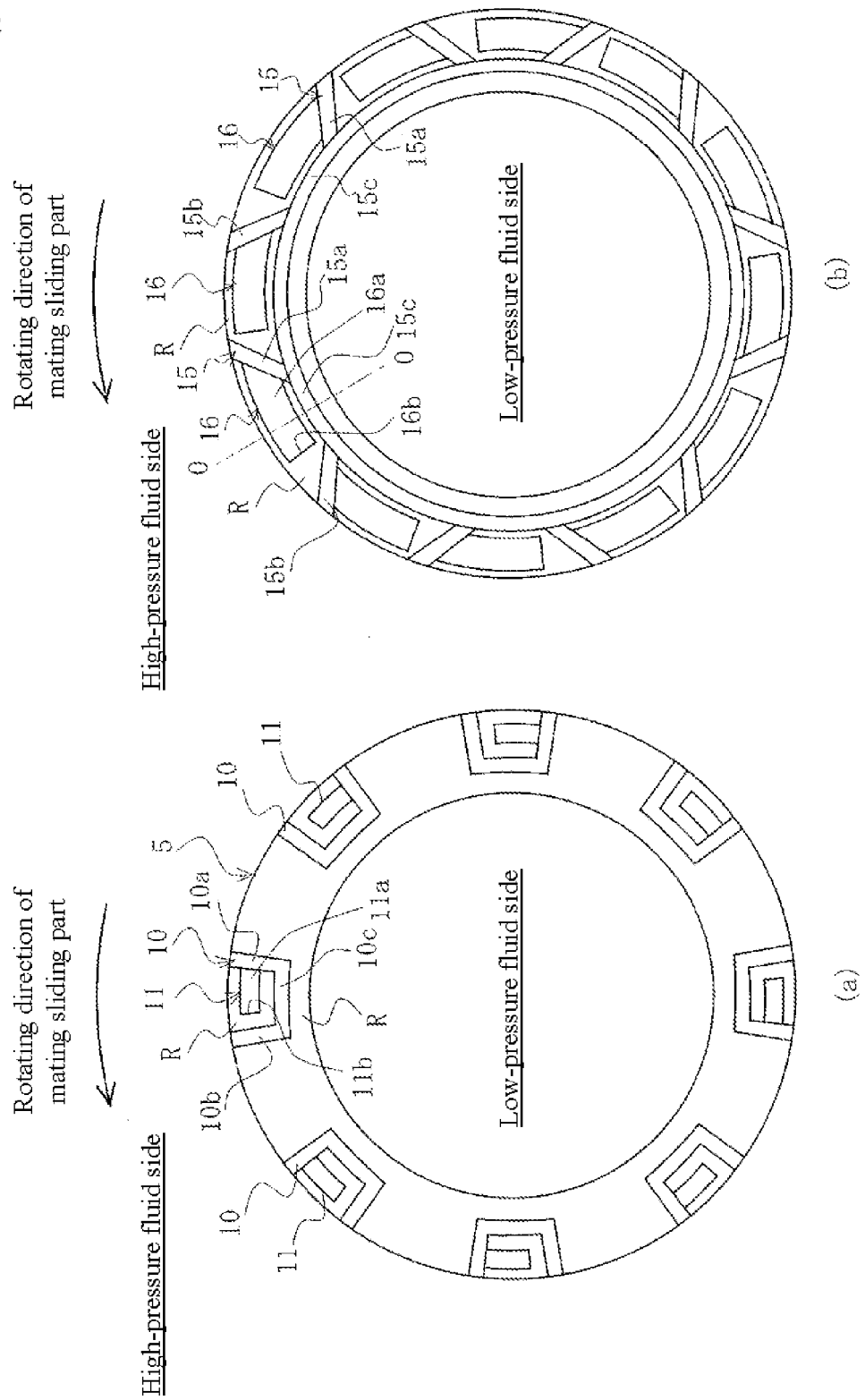
FIG. 2 is a set of drawings showing the sealing face of the sliding component pertaining to Example 1 of the present invention, where the fluid circulation groove is provided independently at multiple locations in the circumferential direction in (a), while the fluid circulation groove is open in the circumferential direction in (b).
Figure 3:
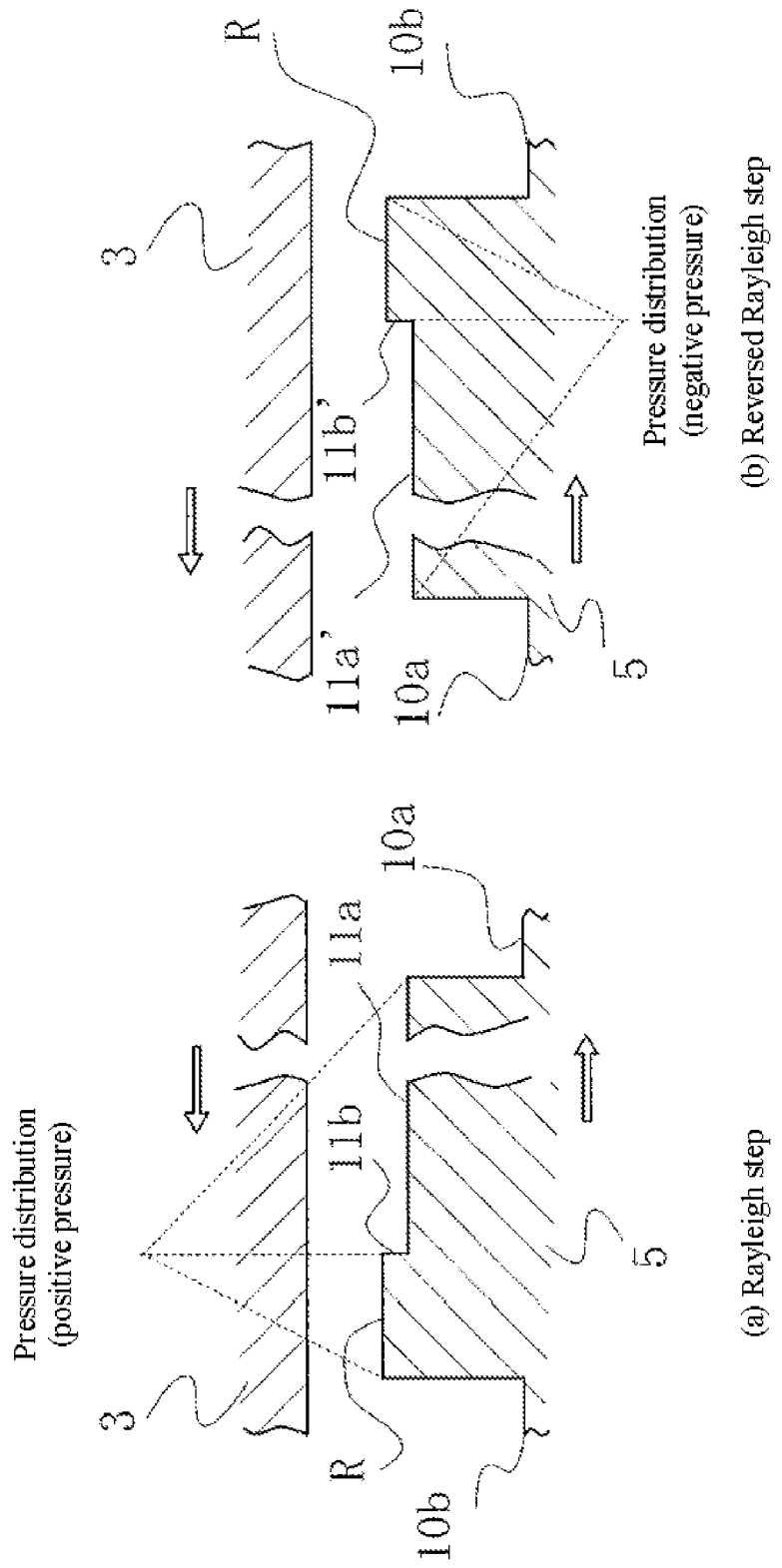
FIG. 3 is a set of drawings explaining a positive-pressure generation mechanism constituted by a Rayleigh step mechanism, etc., and negative-pressure generation mechanism constituted by a reversed Rayleigh step mechanism, etc., where (a) shows a Rayleigh step mechanism and (b) shows a reversed Rayleigh step mechanism.

The sliding component pertaining to Example 1 of the present invention is explained by referring to FIGS. 1 through 3.

In the following example, a mechanical seal, which is an example of a sliding component, is explained. It should also be noted that, while the outer periphery side of the sliding component constituting the mechanical seal is referred to as the high-pressure fluid side (sealed fluid side) and the inner periphery side is referred to as the low-pressure fluid side (atmosphere side) in the explanation, the present invention is not limited to the foregoing and it can also be applied when the high-pressure fluid side and low-pressure fluid side are reversed.

FIG. 1 is a longitudinal section view showing an example of a mechanical seal of the inside type that seals the sealed fluid on the high-pressure fluid side that would otherwise leak from the outer periphery toward the inner periphery of the sealing face, which mechanical seal comprises: one sliding part which is a circular rotating ring 3 and provided via a sleeve 2 on a rotating shaft 1 side that drives a pump impeller (not illustrated) on the high-pressure fluid side in a manner rotatable together with the rotating shaft 1; and the other sliding part which is a circular stationary ring 5 and provided on a pump housing 4 in a manner not rotating but movable in the axial direction; and sliding surfaces S that have been lapped or otherwise finished to a mirror surface are caused to slide against each other while in contact by means of a coiled wave spring 6 and bellows 7 that bias the stationary ring 5 in the axial direction. In other words, this mechanical seal prevents the sealed fluid from flowing out from the outer periphery of the rotating shaft 1 toward the atmosphere side between the respective sealing faces S of the rotating ring 3 and stationary ring 5.

Although the width of the sealing face of the rotating ring 3 is greater than the width of the sealing face of the stationary ring 5 in FIG. 1, the width relationship is not limited to the foregoing and it goes without saying that the present invention can also be applied when the opposite is true.

FIG. 2 shows the sealing face of the sliding component pertaining to Example 1 of the present invention, and the following explains an example where the fluid circulation groove is formed on the sealing face of the stationary ring 5 in FIG. 2.

Although the same applies when the fluid circulation groove is formed on the sealing face of the rotating ring 3, the fluid circulation groove only needs to communicate with the sealed fluid side in this case and does not have to extend to the outer periphery side of the sealing face.

In FIG. 2 (a), the outer periphery side of the sealing face of the stationary ring 5 corresponds to the high-pressure fluid side, while the inner periphery side corresponds to the low-pressure fluid side, such as the atmosphere side, and the mating sliding surface rotates in the counterclockwise direction.

A fluid circulation groove 10 that communicates with the high-pressure fluid side while being isolated from the low-pressure fluid side by the smooth area R (it may be referred to as "land" in the present invention) of the sealing face is provided at multiple locations in the circumferential direction on the sealing face of the stationary ring 5.

The fluid circulation groove 10 comprises an inlet 10a through which fluid enters from the high-pressure fluid side, outlet 10b through which fluid is released to the high-pressure fluid side, and communicating part 10c through which the inlet 10a and outlet 10b communicate with each other in the circumferential direction, and is isolated from the low-pressure fluid side by the land R. The fluid circulation groove 10 plays the role of actively introducing sealed fluid from the high-pressure fluid side to the sealing face and then discharging the fluid to prevent the fluid, which contains corrosion products, etc., from accumulating on the sealing face, and therefore it has the inlet 10a and outlet 10b formed on it to facilitate the intake and discharge of sealed fluid to/from the sealing face according to the rotating direction of the mating sliding surface, while being isolated from the low-pressure fluid side by the land R to reduce leakage. In this example, the inlet 10a and outlet 10b are formed as a straight line that extends radially from the center of the sealing face, but their design is not limited to the foregoing and the inlet 10a and outlet 10b may be inclined further. They can also be a curved line (such as an arc) instead of a straight line. Also, the width and depth of the fluid circulation groove 10 are set optimally according to the pressure, type (viscosity), etc., of sealed fluid.

On the sealing face on which the fluid circulation groove 10 is provided, a positive-pressure generation mechanism 11 with a positive-pressure generation groove 11a shallower than the fluid circulation groove 10 is provided in the area surrounded by the fluid circulation groove 10 and high-pressure fluid side. The positive-pressure generation mechanism 11 generates positive pressure (dynamic pressure) to increase the fluid film between the sealing faces, thereby improving the lubrication performance.

The positive-pressure generation groove 11a communicates with the inlet of the fluid circulation groove 10 and is isolated from the outlet 10b and high-pressure fluid side by the land R.

In this example, the positive-pressure generation mechanism 11 is constituted by the Rayleigh step mechanism having the positive-pressure generation groove 11a that communicates with the inlet 10a of the fluid circulation groove 10, and also having a Rayleigh step 11b, but the mechanism is not limited to the foregoing and may be constituted by a femtosecond-laser processed groove with dam, for example, so long as the mechanism generates positive pressure, in essence.

The Rayleigh step mechanism and reversed Rayleigh step mechanism are explained in detail later.

FIG. 2 (b) is different from FIG. 2 (a) in that the fluid circulation groove is open in the circumferential direction, but basically it is similar to FIG. 2 (a).

In FIG. 2 (b), as is the case in FIG. 2 (a), an inlet 15a and outlet 15b of a fluid circulation groove 15 which communicates to the high-pressure fluid side while being isolated from the low-pressure fluid side by the smooth area R of the sealing face are paired and provided in multiple locations in the circumferential direction, and a communicating part 15c communicates with the pair of inlet 15a and outlet 15b while extending along the entire circumference and allowing the communicating parts of all fluid circulation grooves 15 to communicate with each other. In addition, the inlet 15a and outlet 15b of the fluid circulation groove 15, being formed symmetrically with respect to the center line 0-0, become wider toward the high-pressure fluid side, and the angle of intersection between the inlet 15a and outlet 15b is set to obtuse (such as approx. 120°).

A Rayleigh step mechanism 16 having a positive-pressure generation groove 16a and Rayleigh step 16b is provided in the area surrounded by the fluid circulation groove 15 and high-pressure fluid side. In FIG. 2 (b), the communicating part 15c of the fluid circulation groove 15 extends along the entire circumference and therefore the area surrounded by the fluid circulation groove 15 and high-pressure fluid side is also formed between the adjacent fluid circulation grooves 15, and as a result the Rayleigh step mechanism 16 is also provided in this area. Due to the above, the Rayleigh step mechanisms 16 are densely provided in the circumferential direction and consequently positive pressure is generated successively in the circumferential direction, which is favorable because the fluid film between the sealing faces will increase and the lubrication performance will improve.

As explained above, according to the constitution of Example 1, fluid is actively introduced and discharged to/from the sealing face by the fluid circulation groove 10, 15 and the fluid between the sealing faces circulates as a result, which prevents the fluid containing causative substances for deposits from accumulating and keeps abrasive powder and other foreign matter from collecting, and furthermore prevents deposits from forming, and consequently the sealing function of the sealing face can be maintained for an extended period of time. Here, the fluid circulation groove 10, 15 is isolated from the low-pressure fluid side by the land R and therefore leakage of fluid from the fluid circulation groove 10, 15 to the low-pressure fluid side can be reduced while leakage can also be prevented in a stationary state. Also at the same time, the positive-pressure generation mechanism 11, 16 increases the fluid film between the sealing faces, which in turn allows for improvement of lubrication performance and further promotion of the circulation of fluid between the sealing faces. Since the positive-pressure generation mechanism 11, 16 is constituted by utilizing the inlet 10a, 15a of the fluid circulation groove 10, 15, production of the positive-pressure generation mechanism 11, 16 can be simplified.

Here, the positive-pressure generation mechanism comprising a Rayleigh step mechanism etc., and the negative-pressure generation mechanism comprising a reversed Rayleigh step mechanism, etc., are explained by referring to FIG. 3.

In FIG. 3 (a), the mating sliding parts, or specifically the rotating ring 3 and stationary ring 5, slide relative to each other as shown by the arrows. For example, the Rayleigh step 11b is formed on the sealing face of the stationary ring 5 perpendicular to the direction of relative movement in a manner facing the upstream side, and the groove 11a constituting the positive-pressure generation groove is formed on the upstream side of the Rayleigh step 11b. The sealing faces of the mating rotating ring 3 and stationary ring 5 are flat.

As the rotating ring 3 and stationary ring 5 move relative to each other in the directions of the arrows, the fluid present between the sealing faces of the rotating ring 3 and stationary ring 5 tends to also move in the direction of movement of the rotating ring 3 or stationary ring 5 due to the viscosity of the fluid itself, and therefore positive pressure (dynamic pressure) generates as shown by the broken lines due to the presence of the Rayleigh step 11b.

In the figure, 10a and 10b indicate the inlet and outlet of the fluid circulation groove, respectively, while R indicates the land.

In FIG. 3 (b), the mating sliding parts, or specifically the rotating ring 3 and stationary ring 5, also slide relative to each other as shown by the arrows, but on the sealing faces of the rotating ring 3 and stationary ring 5, a reversed Rayleigh step 11b' is formed perpendicular to the direction of relative movement in a manner facing the downstream side, and a groove 11a' constituting the negative-pressure generation groove is formed on the downstream side of the reversed Rayleigh step 11b'. The sealing faces of the mating rotating ring 3 and stationary ring 5 are flat.

As the rotating ring 3 and stationary ring 5 move relative to each other in the directions of the arrows, the fluid present between the sealing faces of the rotating ring 3 and stationary ring 5 tends to also move in the direction of movement of the rotating ring 3 or stationary ring 5 due to the viscosity of the fluid itself, and therefore negative pressure (dynamic pressure) generates as shown by the broken lines due to the presence of the reversed Rayleigh step 11b'.

In the figure, 10a and 10b indicate the inlet and outlet of the fluid circulation groove, respectively, while R indicates the land.

Example 2

Figure 4:
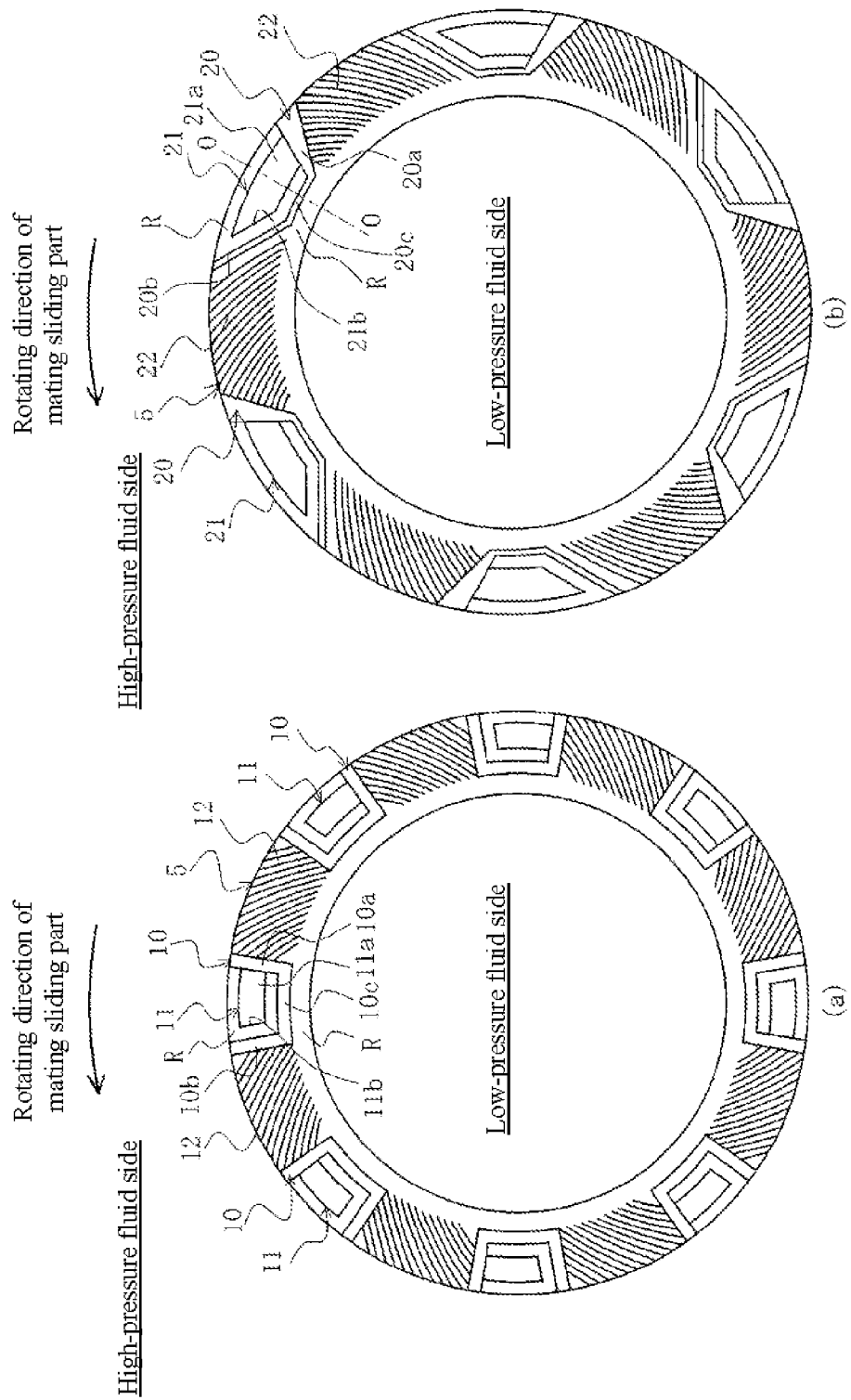
FIG. 4 is a set of drawing showing the sealing face of the sliding component pertaining to Example 2 of the present invention.
Figure 5:
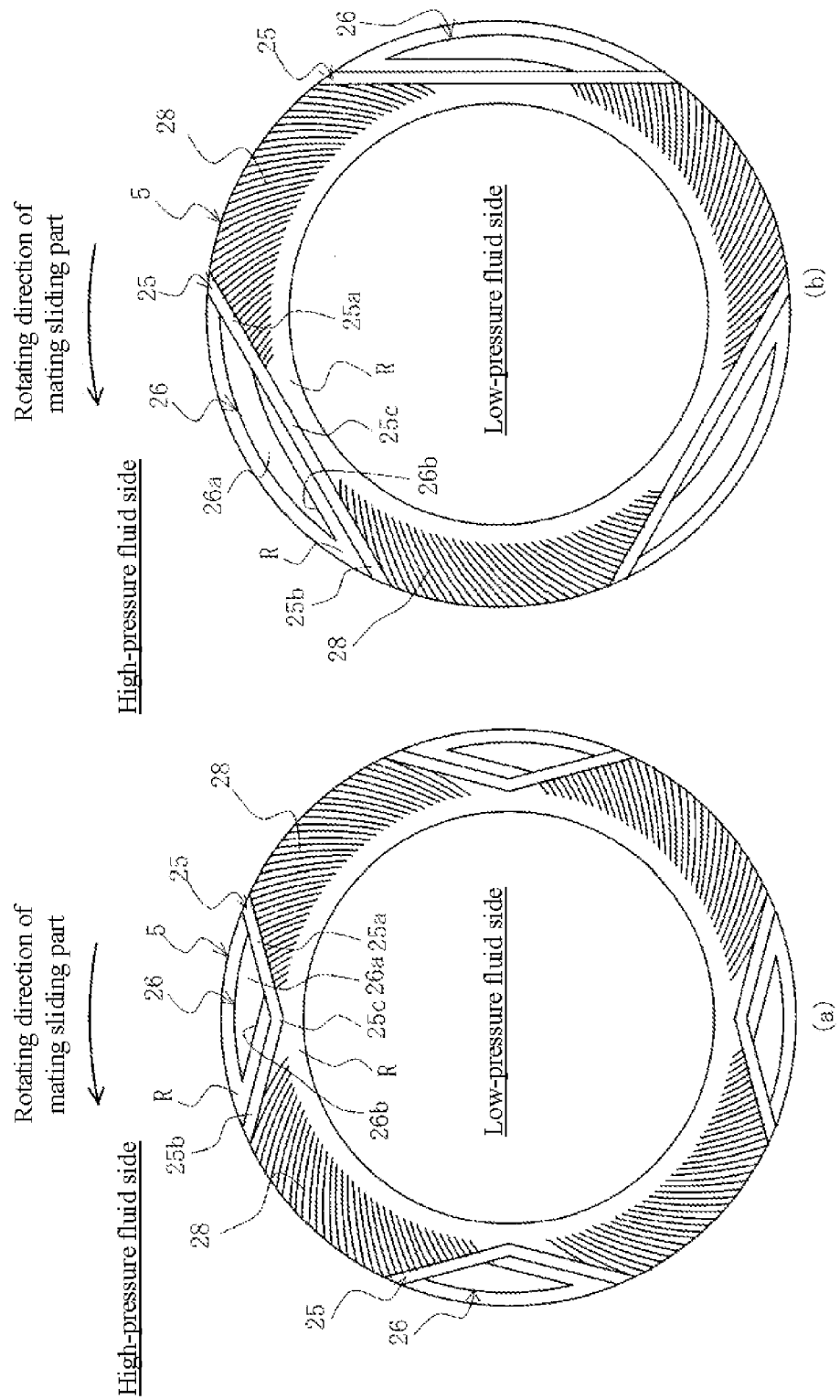
FIG. 5 is a set of drawing showing the sealing face of the sliding component pertaining to Example 2 of the present invention.

The sliding component pertaining to Example 2 of the present invention is explained by referring to FIGS. 4 and 5.

The sliding component pertaining to Example 2 is different from the sliding component in Example 1 in that a spiral groove 12 that discharges fluid to the high-pressure fluid side is provided additionally on the sealing face, but the remainder of the basic constitution is the same as in Example 1 and therefore the same members are denoted by the same symbols and duplicate explanations are omitted.

The stationary ring 5 shown in FIG. 4 (a) has the same sealing face of the stationary ring 5 in FIG. 2 (a) except that the spiral groove 12 is provided additionally, or specifically the spiral groove 12 that discharges fluid to the high-pressure fluid side by means of relative sliding of the rotating ring 3 and stationary ring 5 is provided on the outside of the area surrounded by the fluid circulation groove 10 on the sealing face of the stationary ring 5 and also by the high-pressure fluid side, which is to say, between the adjacent fluid circulation grooves 10, 10. In FIG. 4, the spiral groove 12 is provided, at multiple locations, as a curved (spiral) line inclining in the counterclockwise direction from the inner periphery side toward the outer periphery side, where it communicates with the high-pressure fluid side and is isolated from the low-pressure fluid side by the land R. The spiral groove 12 plays the role of pushing back to the high-pressure fluid side the sealed fluid that would otherwise leak to the low-pressure fluid side from the high-pressure fluid side thereby improving the sealing property, effectively preventing leakage between the adjacent fluid circulation grooves 10, 10 where the positive-pressure generation mechanism 11 is not provided and contributing to improvement of the sealing property of the sealing face as a whole. Also, because the spiral groove 12 is isolated from the low-pressure fluid side by the land R, leakage does not occur in a stationary state.

The stationary ring 5 shown in FIG. 4 (b) has a slightly different planar shape for a Rayleigh step mechanism 21 because the shape of a fluid circulation groove 20 is different from that of the fluid circulation groove 10 in FIG. 4 (a), but the remainder of the basic constitution is the same as in FIG. 4 (a).

With the fluid circulation groove 20 in FIG. 4 (b), the groove width of an outlet 20b and communicating part 20c is smaller than that of an inlet 20a, while the inclination angle of the outlet 20b is greater than that of the inlet 20a, and they are asymmetrical with respect to the center line 0-0. In addition, a Rayleigh step 21b of the Rayleigh step mechanism 21 is set with a large inclination angle to follow the outlet 20b. Furthermore, the inclination angle of a spiral groove 22 is also set large to follow the outlet 20b.

The fluid circulation groove 20 in this example can disperse more fluid over the sealing face due to the throttling effect of the communicating part 20c and outlet 20b on the fluid that has been taken into the inlet 20a, while the angle of the outlet 20b is set in such a way that the fluid can be easily discharged for greater discharge capacity, which in turn prevents the fluid containing causative substances for deposits, etc., from accumulating on the sealing face, while improving the sealing property of the sealing face as a whole and preventing leakage in a stationary state.

The stationary ring 5 shown in FIG. 5 (a) is different in that a fluid circulation groove 25 has a different shape from what is shown in FIGS. 4 (a) and (b) and in that the fluid circulation groove 25 is provided at four equidistributed locations in the circumferential direction, but the remainder of the basic constitution is the same as in FIGS. 4 (a) and (b).

In FIG. 5 (a), the fluid circulation groove 25 is provided in such a way that an inlet 25a and outlet 25b each have a large inclination angle and the two intersect with each other on the low-pressure fluid side (inner periphery side in FIG. 5), with this intersection part forming a communicating part 25c. The angle of intersection between the inlet 25a and outlet 25b is obtuse (such as approx. 150°). A spiral groove 28 that discharges fluid to the high-pressure fluid side by means of relative sliding of the rotating ring 3 and stationary ring 5 is provided on the outside of the area surrounded by the fluid circulation groove 25 on the sealing face of the stationary ring 5 and also by the high-pressure fluid side, that is to say, between the adjacent fluid circulation grooves 25, 25.

Although the stationary ring 5 shown in FIG. 5 (b) is different from what is shown in FIGS. 4 (a) and (b) in that the fluid circulation groove 25 is shaped in a roughly straight line, and in that the fluid circulation groove 25 is provided at three equidistributed locations in the circumferential direction, the remainder of the basic constitution is the same as in FIGS. 4 (a) and (b).

The fluid circulation groove 25 shown in FIG. 5 (a) facilitates the inflow of fluid into the inlet 25a and discharge of fluid from the outlet 25b because the inlet 25a and outlet 25b each have a large inclination angle, and since the communicating part 25c near the low-pressure fluid side is short, leakage to the low-pressure fluid side from the communicating part 25c can be prevented further.

In addition, the fluid circulation groove 25 shown in FIG. 5 (b) facilitates the circulation of fluid from the inlet 25a to the outlet 25b because the inlet 25a, communicating part 25c, and outlet 25b are formed along a roughly straight line, and there is no leakage to the low-pressure fluid side from the communicating part 25c.

Example 3

Figure 6:
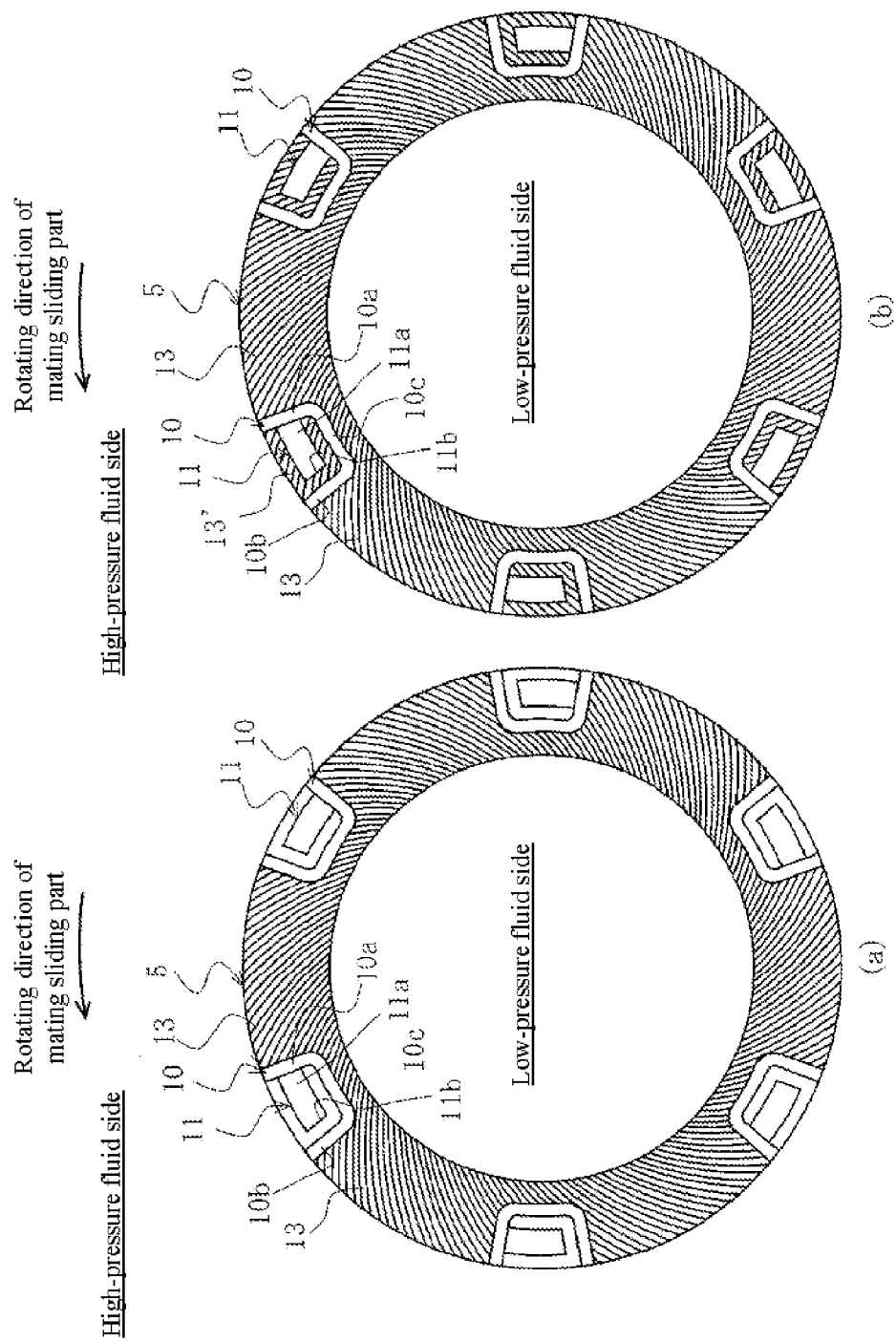
FIG. 6 is a set of drawing showing the sealing face of the sliding component pertaining to Example 3 of the present invention.
Figure 7:
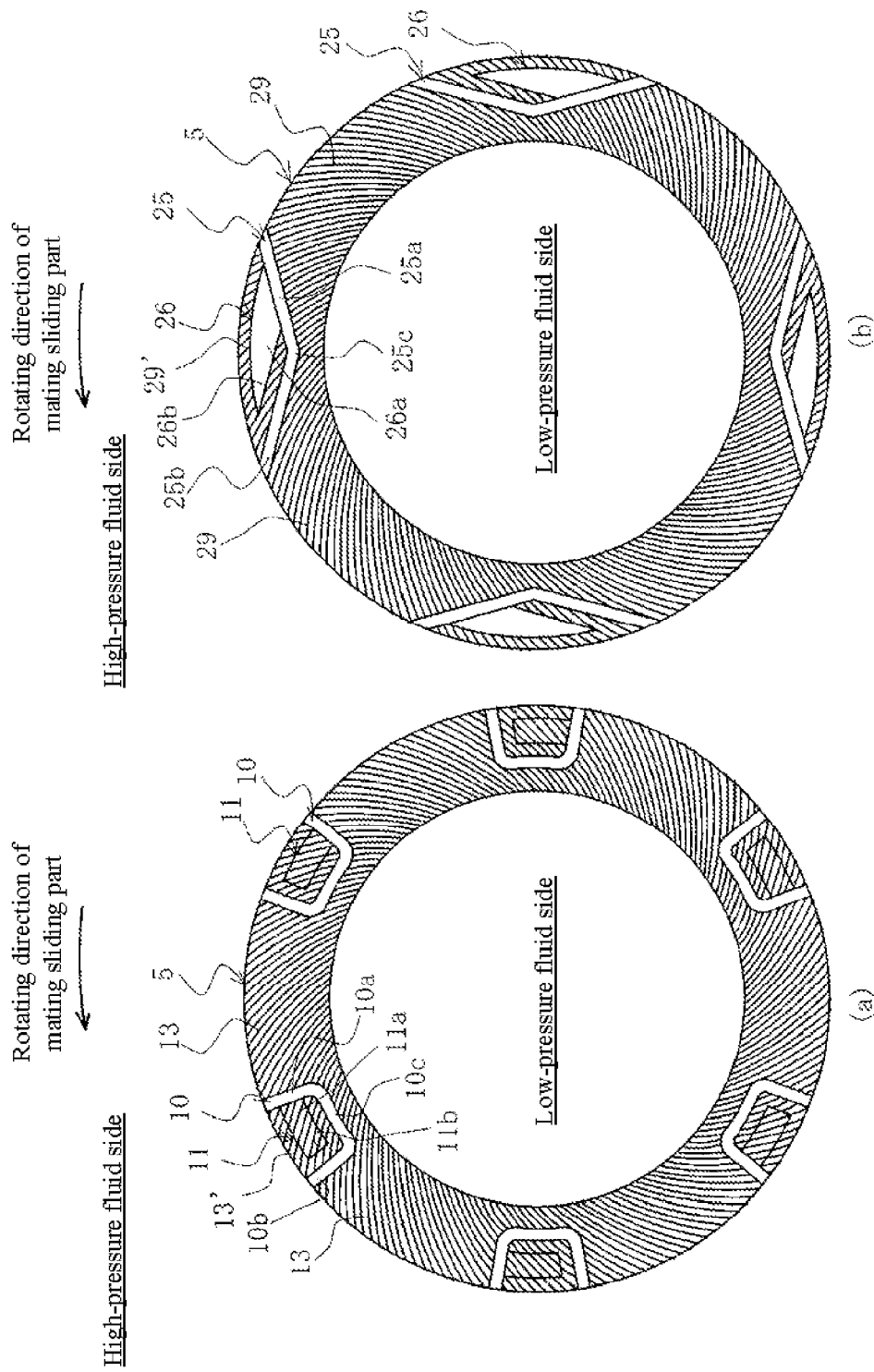
FIG. 7 is a set of drawing showing the sealing face of the sliding component pertaining to Example 3 of the present invention.

The sliding component pertaining to Example 3 of the present invention is explained by referring to FIGS. 6 and 7.

The sliding component pertaining to Example 3 is different from Example 2 in FIGS. 4 and 5 in that a spiral groove 13 that discharges fluid to the high-pressure fluid side is provided in a manner communicating with the low-pressure fluid side, but the remainder of the basic constitution is the same as in Example 2 corresponding to FIGS. 4 and 5 and therefore the same members are denoted by the same symbols and duplicate explanations are omitted.

The stationary ring 5 shown in FIG. 6 (a) has the same fluid circulation groove 10 and Rayleigh step mechanism 11 shown in FIG. 4 (a), but the spiral groove 13 provided on the outside of the area surrounded by the fluid circulation groove 10 and high-pressure fluid side communicates with the low-pressure fluid side, as well.

Also, with the stationary ring 5 shown in FIG. 6 (b), another spiral groove 13' is provided in the area surrounded by the fluid circulation groove 10 and high-pressure fluid side, except for the area of the Rayleigh step mechanism 11, in a manner communicating with the high-pressure fluid side.

Furthermore, with the stationary ring 5 shown in FIG. 7 (a), another spiral groove 13' is provided in the area of the Rayleigh step mechanism 11 in a manner communicating with the high-pressure fluid side.

Since the spiral groove 13 provided on the outside of the area surrounded by the fluid circulation groove 10 and high-pressure fluid side as shown in FIGS. 6 and 7 also communicates with the low-pressure fluid side, there is a benefit of vaporous cavitation not occurring easily on the low-pressure side of the spiral groove 13. In addition, the stationary ring 5 shown in FIG. 6 (b) can reduce leakage further because the spiral groove 13' is provided in the area surrounded by the fluid circulation groove 10 and high-pressure fluid side, except for the area of the Rayleigh step mechanism 11, and therefore fluid is discharged to the high-pressure fluid side also via the area of the spiral groove 13'. Moreover, the stationary ring 5 shown in FIG. 7 (a) can simplify the machining of spiral grooves. However, there is also a drawback in that the amount of positive pressure generated by the Rayleigh step mechanism 11 will decrease.

The stationary ring 5 shown in FIG. 7 (b) has the same fluid circulation groove 25 and Rayleigh step mechanism. 26 as those in FIG. 5 (a), and a spiral groove 29 provided on the outside of the fluid circulation groove 25 communicates with the low-pressure fluid side. In addition, another spiral groove 29' is provided in the area surrounded by the fluid circulation groove 25 and high-pressure fluid side, except for the area of the Rayleigh step mechanism 26, in a manner communicating with the high-pressure fluid side. Here, the spiral groove 29' may be provided in the area surrounded by the fluid circulation groove 25 and high-pressure fluid side, and in the area of the Rayleigh step mechanism 26, in a manner communicating with the high-pressure fluid side, in order to simplify the machining of spiral groove. However, there is also a drawback in that the amount of positive pressure generated by the Rayleigh step mechanism will decrease.

Since the spiral groove 29 provided on the outside of the area surrounded by the fluid circulation groove 25 and high-pressure fluid side in this example communicates with the low-pressure fluid side, there is a benefit of vaporous cavitation not occurring easily on the low-pressure side of the spiral groove 29.

On the other hand, the spiral groove 29' in the area surrounded by the fluid circulation groove 25 and high-pressure fluid side discharges to the high-pressure fluid side the fluid that would otherwise leak to the low-pressure side from the high-pressure side, and this has the effect of reducing leakage further.

Example 4

Figure 8:
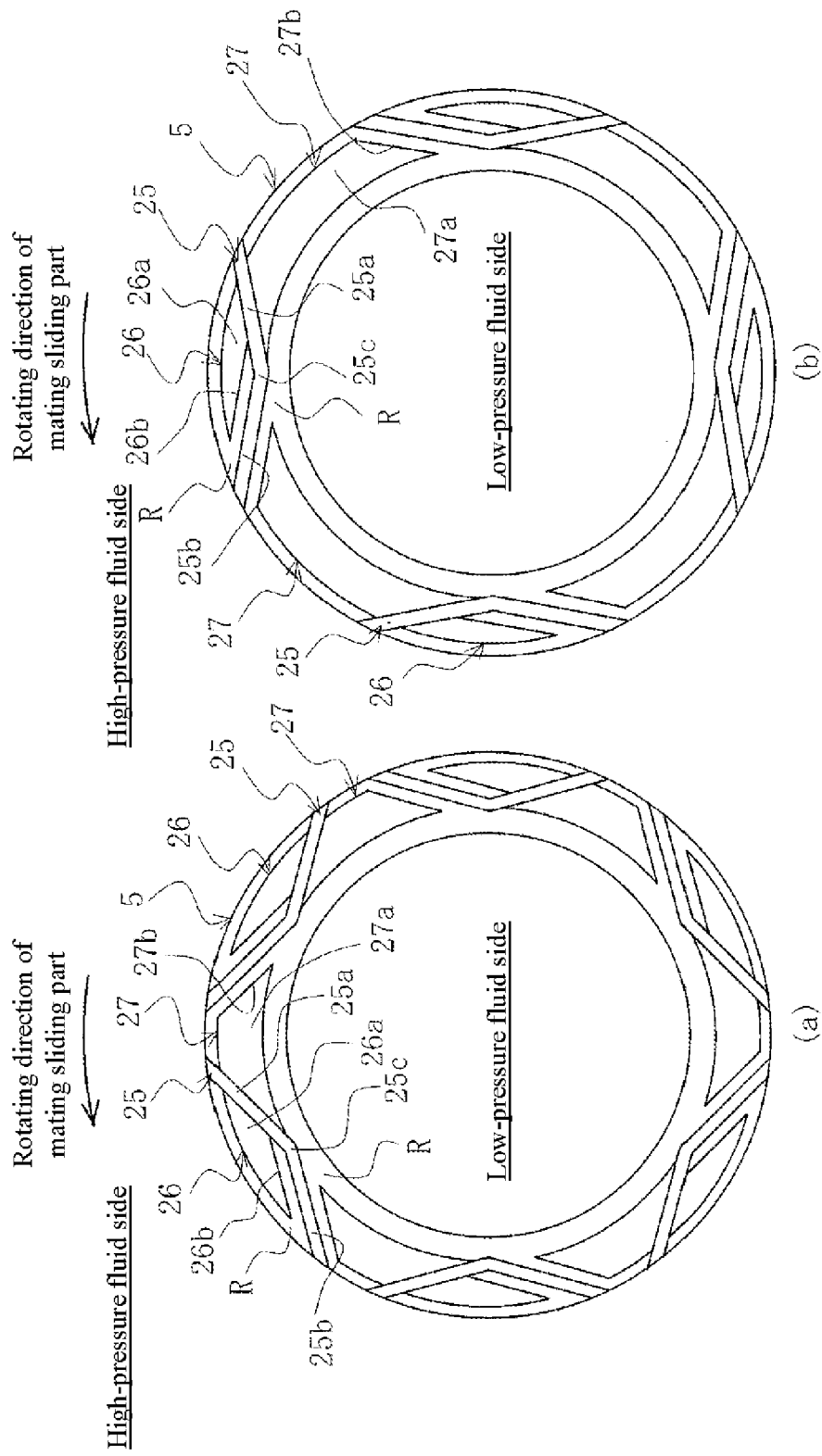
FIG. 8 is a set of drawing showing the sealing face of the sliding component pertaining to Example 4 of the present invention.
Figure 9:
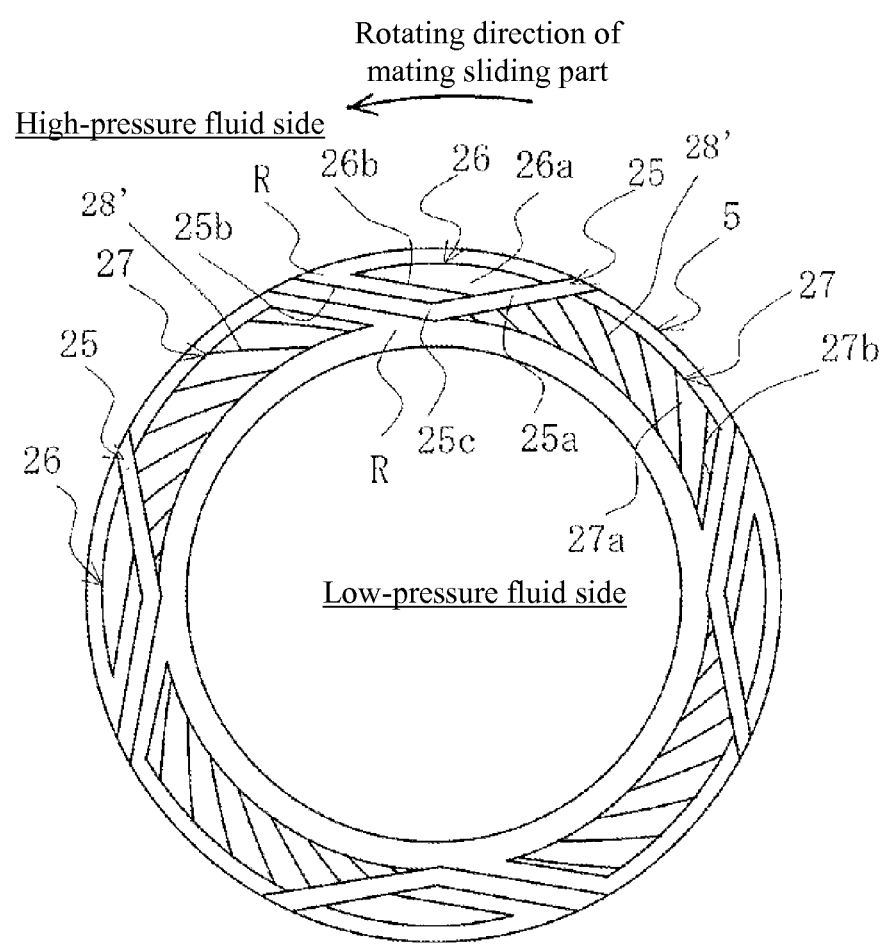
FIG. 9 is a set of drawing showing the sealing face of the sliding component pertaining to Example 4 of the present invention.

The sliding component pertaining to Example 4 of the present invention is explained by referring to FIGS. 8 and 9.

The sliding component pertaining to Example 4 is different from Example 2 shown in FIG. 5 (a) in that a reversed Rayleigh step mechanism 27 is provided instead of the spiral groove, but the remainder of the basic constitution is the same as in FIG. 5 (a) and therefore the same members are denoted by the same symbols and duplicate explanations are omitted.

In FIG. 8 (a), the sealing face of the stationary ring 5 has the fluid circulation groove 25 and Rayleigh step mechanism 26 provided at six equidistributed locations in the circumferential direction, and also provided on the outside of the area surrounded by the fluid circulation groove 25 and high-pressure fluid side; that is to say, between the adjacent fluid circulation grooves 25, 25, is the reversed Rayleigh step mechanism 27 constituting the negative-pressure generation mechanism which in turn comprises a groove 27a constituting the negative-pressure generation groove shallower than the fluid circulation groove 25 and a reversed Rayleigh step 27b. The groove 27a communicates with the inlet 25a and is isolated from the outlet 25b and low-pressure fluid side by the land R.

FIG. 8 (b) is different from FIG. 8 (a) in that the fluid circulation groove 25 is provided at four equidistributed locations in the circumferential direction and in that the groove 27a of the reversed Rayleigh step mechanism 27 provided between the adjacent fluid circulation grooves 25, 25 is formed longer than the groove 27a in FIG. 8 (a) in the circumferential direction, but the remainder of the constitution is the same as in FIG. 8 (a).

In addition, FIG. 9 is different from FIG. 8 (b) in that a spiral groove 28' is provided additionally in the groove 27a of the reversed Rayleigh step mechanism 27 on the sealing face shown in FIG. 8 (b), but the remainder of the constitution is the same as in FIG. 8 (b). On the sealing face shown in FIG. 9, fluid that has been taken into the groove 27a of the reversed Rayleigh step mechanism 27 is discharged efficiently via the spiral groove 28'.

In Example 4 explained herein, the reversed Rayleigh step mechanism 27 constituting the negative-pressure generation mechanism plays the role of improving the sealing property by generating negative pressure to take into the groove 27a the sealed fluid that would otherwise leak to the low-pressure fluid side from the high-pressure fluid side and then return it to the high-pressure fluid side via the fluid circulation groove 25, effectively preventing leakage between the adjacent fluid circulation grooves 25, 25 where the Rayleigh step mechanism 26 is not provided thereby improving the sealing property of the sealing face as a whole.

For the number of equidistributed Rayleigh step mechanisms 26 and reversed Rayleigh step mechanisms 27, and the length ratio of the Rayleigh step mechanism 26 and the reversed Rayleigh step mechanism 27, optimal settings can be selected as deemed appropriate.

Example 5

Figure 10:
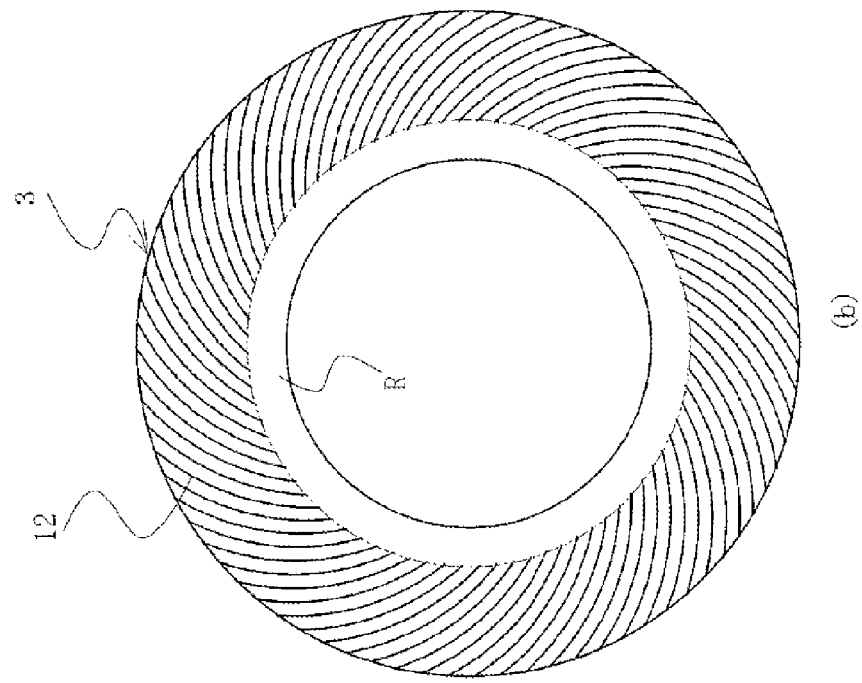
FIG. 10 is a drawing showing the sealing face of the sliding component pertaining to Example 5 of the present invention.
Figure 10:
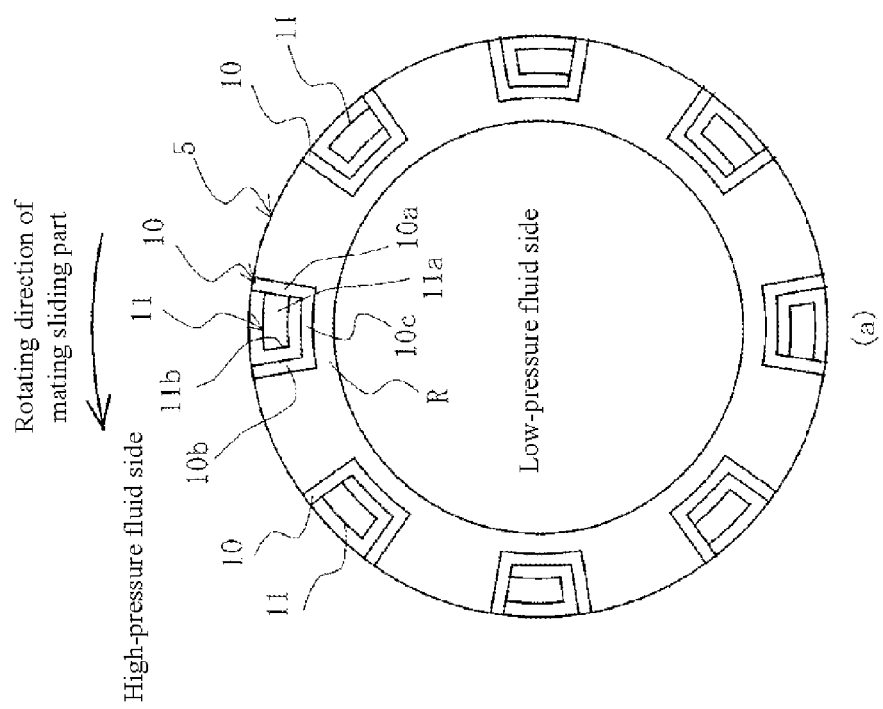

The sliding component pertaining to Example 5 of the present invention is explained by referring to FIG. 10.

The sliding component pertaining to Example 5 is different from Example 2 shown in FIG. 4 (a) in that the spiral groove 12 is provided on the other sealing face, but the remainder of the basic constitution is the same as in FIG. 4 (a) and therefore the same members are denoted by the same symbols and duplicate explanations are omitted.

In FIG. 10, (a) shows the stationary ring 5 being one sliding ring, while (b) shows the rotating ring 3 being the other sliding ring.

The fluid circulation groove 10 and positive-pressure generation mechanism 11 are provided on the sealing face of the stationary ring 5.

The spiral groove 12 that discharges fluid to the high-pressure fluid side by means of relative sliding of the rotating ring 3 and stationary ring 5 is provided at locations all around the sealing face of the rotating ring 3. In FIG. 10 (b), the spiral groove 12 is provided, at multiple locations, as a curved (spiral) line inclining in the clockwise direction from the inner periphery side toward the outer periphery side, where it communicates with the high-pressure fluid side and is isolated from the low-pressure fluid side by the land R. The spiral groove 12 plays the role of pushing back to the high-pressure fluid side the sealed fluid that would otherwise leak to the low-pressure fluid side from the high-pressure fluid side thereby improving the sealing property, and since the groove is provided successively in the circumferential direction, the sealing property of the sealing area as a whole can be improved further.

In Example 5 explained herein, machining is easy because the fluid circulation groove 10 and positive-pressure generation mechanism 11 are provided on the sealing face different from the one having the spiral groove 12, and the sealing performance also improves because the spiral groove 12 can be provided successively along the entire circumference. Furthermore, leakage does not occur in a stationary state because the spiral groove 12 is isolated by the land R.

Example 6

Figure 11:
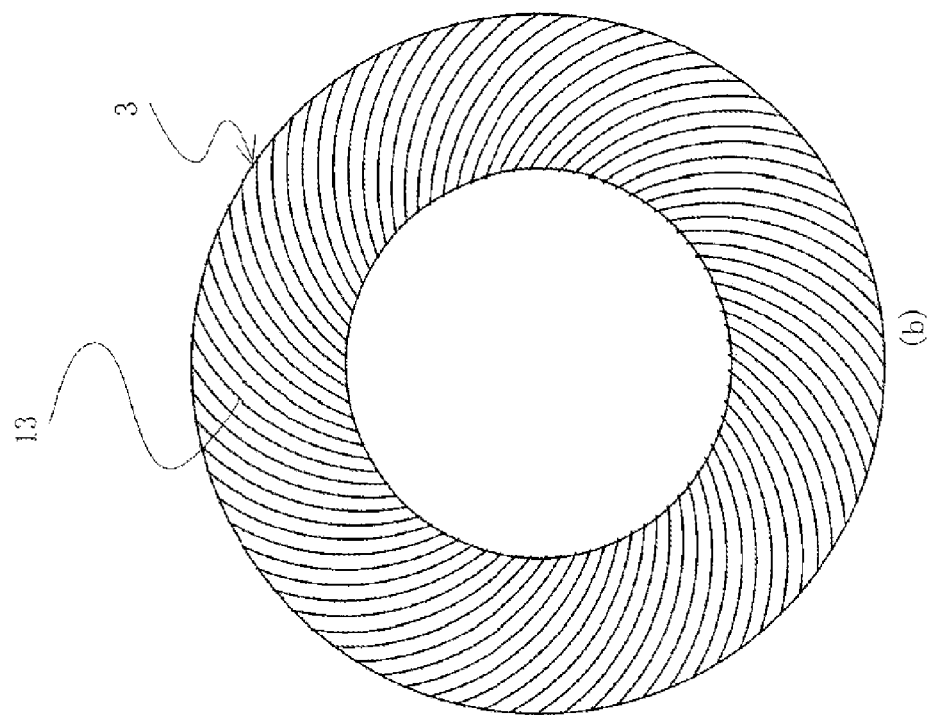
FIG. 11 is a drawing showing the sealing face of the sliding component pertaining to Example 6 of the present invention.
Figure 11:
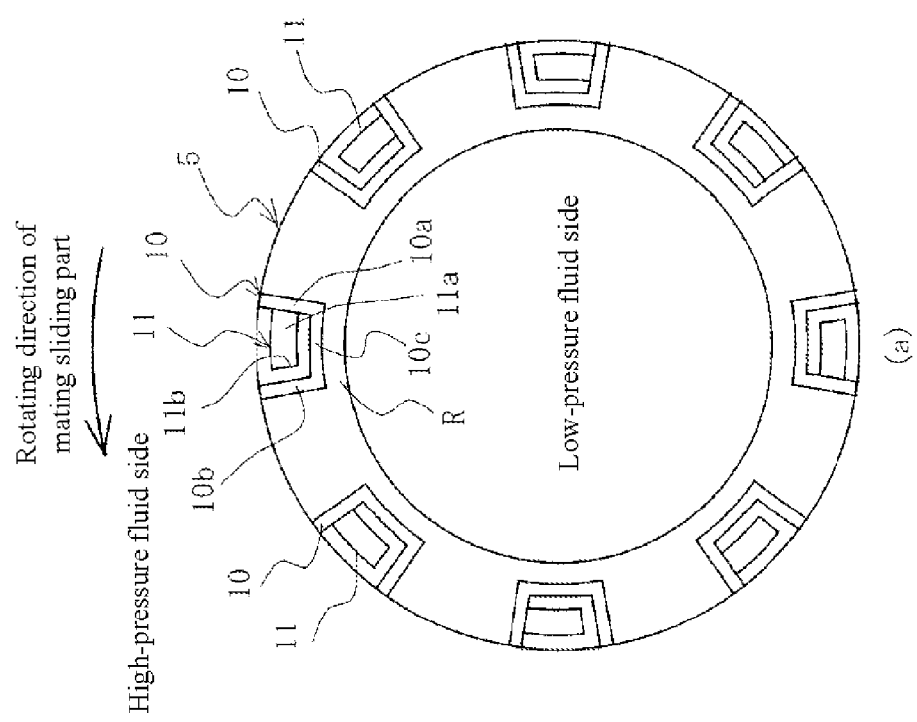

The sliding component pertaining to Example 6 of the present invention is explained by referring to FIG. 11. The sliding component pertaining to Example 6 is the same as Example 5 shown in FIG. 10 in that the spiral groove 13 is provided on the other sealing face, but it is different from Example 5 shown in FIG. 7 in that the spiral groove 13 communicates with the low-pressure fluid side.

In FIG. 11, (a) shows the stationary ring 5 being one sliding ring, while (b) shows the rotating ring 3 being the other sliding ring.

The fluid circulation groove 10 and positive-pressure generation mechanism 11 are provided on the sealing face of the stationary ring 5.

The spiral groove 13 that discharges fluid to the high-pressure fluid side by means of relative sliding of the rotating ring 3 and stationary ring 5 is provided at locations all around the sealing face of the rotating ring 3. In FIG. 11 (b), the spiral groove 13 is provided, at multiple locations, as a curved (spiral) line inclining in the clockwise direction from the inner periphery side toward the outer periphery side, where it communicates with the high-pressure fluid side and low-pressure fluid side.

Since the spiral groove 13 in this example communicates with the low-pressure fluid side, there is a benefit of vaporous cavitation not occurring easily on the low-pressure side of the spiral groove 13. However, there is also a drawback in that leakage cannot be prevented in a stationary state.

In Example 6 explained herein, machining is easy particularly because the fluid circulation groove 10 and positive-pressure generation mechanism 11 are provided on the sealing face different from the one having the spiral groove 13, and the sealing performance also improves further because the spiral groove 13 can be provided successively along the entire circumference.

Example 7

Figure 12:
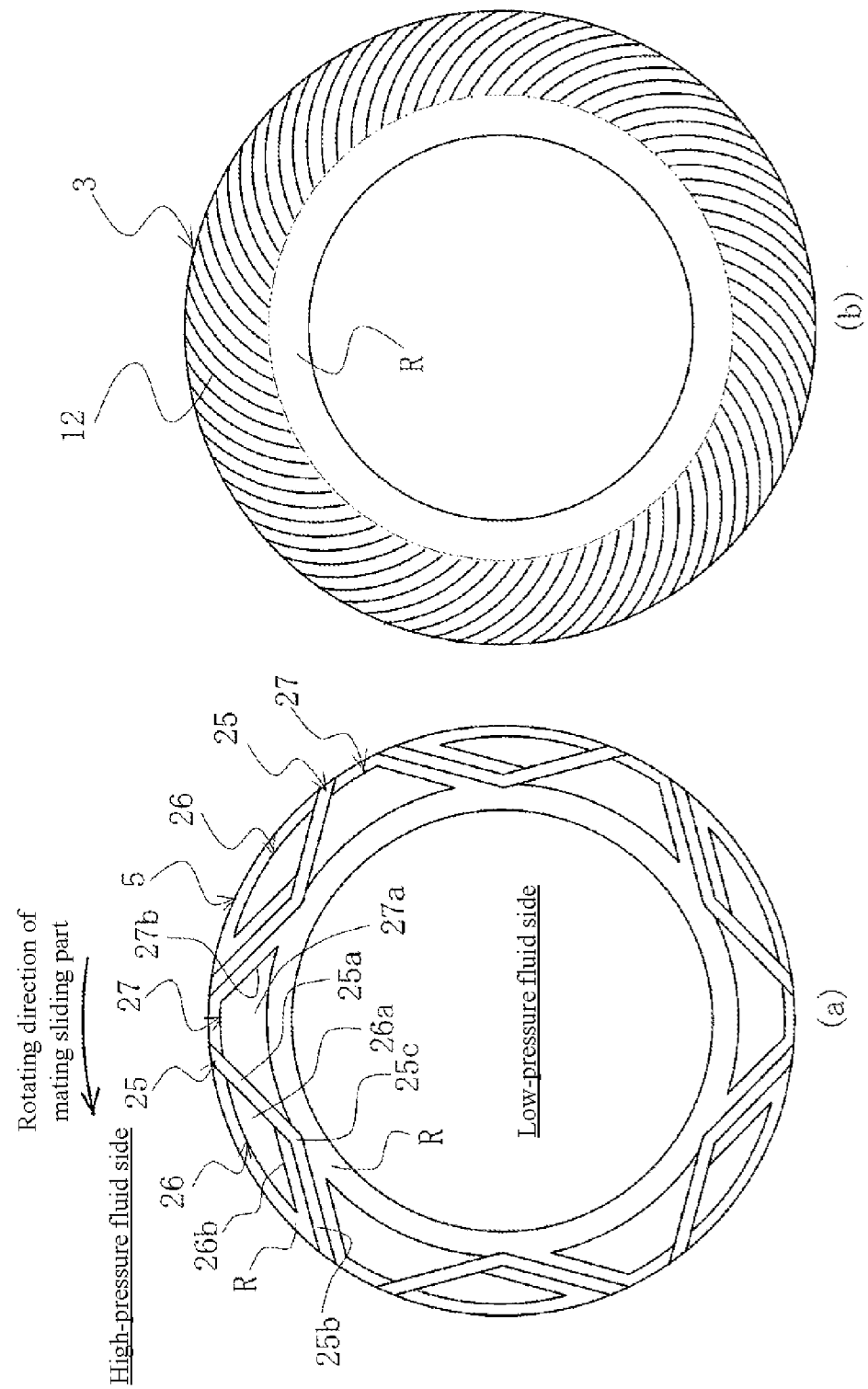
FIG. 12 is a drawing showing the sealing face of the sliding component pertaining to Example 7 of the present invention.

The sliding component pertaining to Example 7 of the present invention is explained by referring to FIG. 12.

The sliding component pertaining to Example 7 is the same as Example 4 shown in FIG. 8 (a) in terms of one sealing face on which the fluid circulation groove 25 is provided, while the same spiral groove 12 as in Example 5 shown in FIG. 10 is provided on the other sealing face.

In FIG. 12, (a) shows the stationary ring 5 being one sliding ring, while (b) shows the rotating ring 3 being the other sliding ring.

In FIG. 12 (a), the fluid circulation groove 25 and positive-pressure generation mechanism 26 are provided at six equidistributed locations in the circumferential direction on the sealing face of the stationary ring 5, and furthermore the reversed Rayleigh step mechanism 27 constituting the negative-pressure generation mechanism, which in turn comprises the groove 27a constituting the negative-pressure generation groove shallower than the fluid circulation groove 25, is provided on the outside of the area surrounded by the fluid circulation groove 25 and high-pressure fluid side, that is to say, between the adjacent fluid circulation grooves 25, 25. The groove 27a communicates with the inlet 25a and is isolated from the outlet 25b and low-pressure fluid side by the land R.

Also, in FIG. 12 (b), the spiral groove 12 that discharges fluid to the high-pressure fluid side by means of relative sliding of the rotating ring 3 and stationary ring 5 is provided at locations all around the sealing face of the rotating ring 3. In this example, the spiral groove 12 is provided, at multiple locations, as a curved (spiral) line inclining in the clockwise direction from the inner periphery side toward the outer periphery side, where it communicates with the high-pressure fluid side and is isolated from the low-pressure fluid side by the land R. The spiral groove 12 plays the role of pushing back to the high-pressure fluid side the sealed fluid that would otherwise leak to the low-pressure fluid side from the high-pressure fluid side thereby improving the sealing property, effectively improving the sealing of the sealing face as a whole.

In Example 7 explained herein, machining is easy particularly because the fluid circulation groove 25 and positive-pressure generation mechanism 26 are provided on the sealing face different from the one having the spiral groove 12, and the sealing performance also improves because the spiral groove 12 can be provided successively along the entire circumference. Furthermore, leakage does not occur in a stationary state because the spiral groove 12 is isolated by the land R.

Example 8

Figure 13:
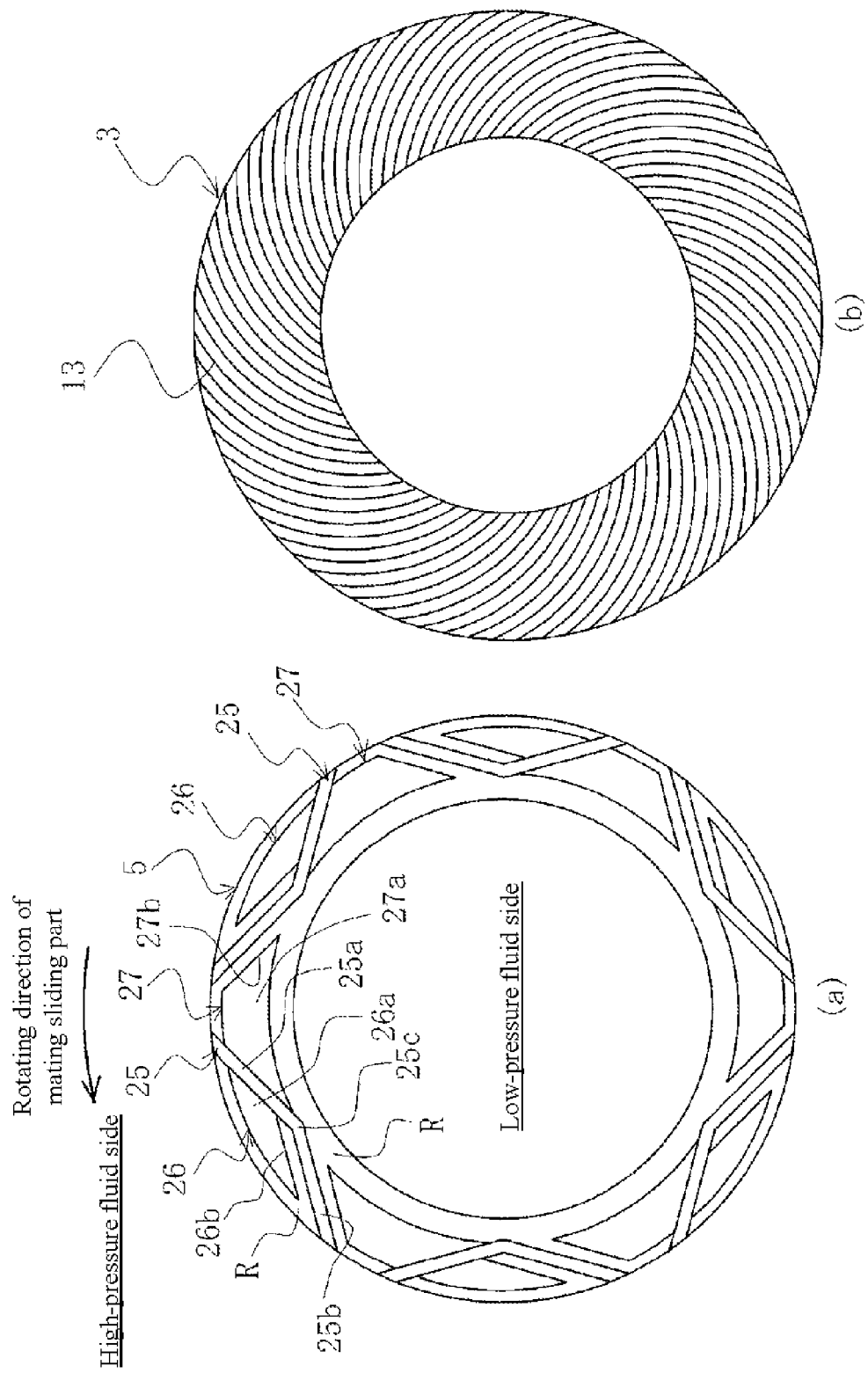
FIG. 13 is a drawing showing the sealing face of the sliding component pertaining to Example 8 of the present invention.

The sliding component pertaining to Example 8 of the present invention is explained by referring to FIG. 13.

The sliding component pertaining to Example 8 is the same as Example 7 shown in FIG. 12 in that the spiral groove 13 is provided on the other sealing face, but it is different from Example 7 shown in FIG. 12 in that the spiral groove 13 communicates with the low-pressure fluid side.

In FIG. 13, (a) shows the stationary ring 5 being one sliding ring, while (b) shows the rotating ring 3 being the other sliding ring.

The fluid circulation groove 25 and positive-pressure generation mechanism 26 are provided at six equidistributed locations in the circumferential direction on the sealing face of the stationary ring 5, and furthermore the reversed Rayleigh step mechanism 27 constituting the negative-pressure generation mechanism, which in turn comprises the groove 27a constituting the negative-pressure generation groove shallower than the fluid circulation groove 25, is provided on the outside of the area surrounded by the fluid circulation groove 25 and high-pressure fluid side, that is to say, between the adjacent fluid circulation grooves 25, 25. The groove 27a communicates with the inlet 25a and is isolated from the outlet 25b and low-pressure fluid side by the land R.

The spiral groove 13 that discharges fluid to the high-pressure fluid side by means of relative sliding of the rotating ring 3 and stationary ring 5 is provided at locations all around the sealing face of the rotating ring 3. In this example, the spiral groove 13 is provided, at multiple locations, as a curved (spiral) line inclining in the clockwise direction from the inner periphery side toward the outer periphery side, as shown in FIG. 13 (b), where it communicates with the high-pressure fluid side and low-pressure fluid side.

Since the spiral groove 13 in this example communicates with the low-pressure fluid side, there is a benefit of vaporous cavitation not occurring easily on the low-pressure side of the spiral groove 13. However, there is also a drawback in that leakage cannot be prevented in a stationary state.

In Example 8 explained herein, machining is easy particularly because the fluid circulation groove 25, positive-pressure generation mechanism 26, and positive-pressure generation mechanism 27 are provided on the sealing face different from the one having the spiral groove 13, and the sealing performance also improves because the spiral groove 13 can be provided successively at locations along the entire circumference.

Example 9

Figure 14:
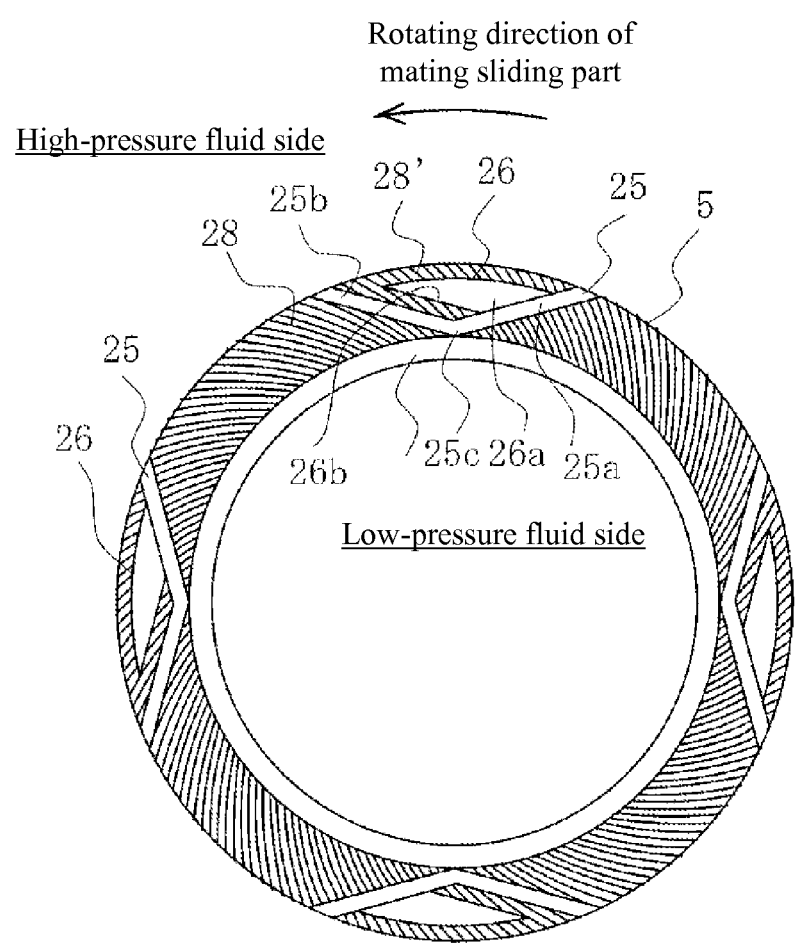
FIG. 14 is a drawing showing the sealing face of the sliding component pertaining to Example 9 of the present invention.

The sliding component pertaining to Example 9 of the present invention is explained by referring to FIG. 14.

The sliding component pertaining to Example 9 is different from Example 2 shown in FIG. 5 (a) in that another spiral groove 28' is provided in the area surrounded by the fluid circulation groove and high-pressure fluid side, except for the area of the Rayleigh step mechanism 26, and in that the surface of the spiral groove 28 provided on the outside of the area surrounded by the spiral groove 28', fluid circulation groove and high-pressure fluid side is set at a position lower than the land R and higher than the groove 26a of the Rayleigh step mechanism 26, but the remainder of the basic constitution is the same as in Example 2 shown in FIG. 5 (a) and therefore the same members are denoted by the same symbols and duplicate explanations are omitted.

In FIG. 14, the fluid circulation groove 25 and Rayleigh step mechanism 26 are provided at four equidistributed positions in the circumferential direction of the sealing face of the stationary ring 5, and the inlet 25a and outlet 25b of the fluid circulation groove 25 are each set to a large inclination angle and the two are provided in such a way that they intersect with each other on the low-pressure fluid side (inner periphery side in FIG. 14), with the point of intersection forming the communicating part 25c. The angle of intersection between the inlet 25a and outlet 25b is obtuse (approx. 150°, for example).

In addition, the spiral groove 28' is provided in the area surrounded by the fluid circulation groove 25 and high-pressure fluid side, except for the area of the Rayleigh step mechanism 26, and the spiral groove 28 that discharges fluid to the high-pressure fluid side is provided on the outside of the area surrounded by the fluid circulation groove and high-pressure fluid side. And, the surface on which these spiral grooves 28, 28' are provided is set at a position lower than the land R and higher than the groove 26a of the Rayleigh step mechanism 26.

To simplify the machining of spiral groove, another spiral groove 29' may be provided in the area of the Rayleigh step mechanism 26 in a manner communicating with the high-pressure fluid side.

In Example 9 explained herein, wear can be reduced particularly because the surface on which the spiral grooves 28, 28' that discharge fluid to the high-pressure fluid side are provided is set lower than the land R, thereby making the fluid film in this area thick.

The foregoing used the drawings to explain examples of the present invention, but its specific constitutions are not limited to these examples and modifications and additions are also included in the scope of the present invention to the extent that they do not deviate from the key points of the present invention.

For example, although the aforementioned examples explained cases where the sliding part was used for either one of the rotating seal ring and stationary seal ring paired for a mechanical seal device, the present invention can also be used as a sliding component for a bearing that slides against a rotating shaft while sealing lubrication oil on one side of a cylindrical sliding surface in the axial direction.

In addition, the aforementioned examples explained cases where high-pressure sealed fluid was present on the outer periphery side, for example, but the present invention can also be applied when high-pressure fluid is present on the inner periphery side.

In addition, the aforementioned examples explained cases where the fluid circulation groove, positive-pressure generation mechanism, and negative-pressure generation mechanism or spiral groove were provided on the stationary ring of the mechanical seal constituting the sliding component, for example, but it can be the other way around, or specifically the fluid circulation groove, positive-pressure generation mechanism, and negative-pressure generation mechanism or spiral groove can be provided on the rotating ring. In this case, the fluid circulation groove and spiral groove need not extend to the outer periphery side of the rotating ring, but they only need to communicate with the sealed fluid side.

DESCRIPTION OF SYMBOLS

1 Rotating shaft
2 Sleeve
3 Rotating ring
4 Housing
5 Stationary ring
6 Coiled wave spring
7 Bellows
10 Fluid circulation groove
11 Positive-pressure generation mechanism (Rayleigh step mechanism)
12 Spiral groove
13, 13' Spiral groove
15 Fluid circulation groove
16 Positive-pressure generation mechanism (Rayleigh step mechanism)
20 Fluid circulation groove
21 Positive-pressure generation mechanism (Rayleigh step mechanism)
22 Spiral groove
25 Fluid circulation groove
26 Positive-pressure generation mechanism (Rayleigh step mechanism)
27 Negative-pressure generation mechanism (reversed Rayleigh step mechanism)
28, 28' Spiral groove
29, 29' Spiral groove
R Land

The invention claimed is:

1. A sliding component characterized in that: with respect to a pair of sliding parts that slide relative to each other, one sealing face has a fluid circulation groove comprising an inlet through which fluid enters from a high-pressure fluid side, an outlet through which fluid is released to the high-pressure fluid side, and a communicating part through which the inlet and outlet communicate with each other; wherein the fluid circulation groove is isolated from a low-pressure fluid side by a land, a positive-pressure generation mechanism is provided in an area surrounded by the fluid circulation groove and high-pressure fluid side, and the positive-pressure generation mechanism communicates with the inlet and is isolated from the outlet and high-pressure fluid side by a land.

2. A sliding component according to claim 1, characterized in that the fluid circulation groove is provided at multiple locations, each isolated by a land, in a circumferential direction on the sealing face.

3. A sliding component according to claim 2, characterized in that the positive-pressure generation mechanism is constituted by a Rayleigh step mechanism.

4. A sliding component according to claim 2, characterized in that a spiral groove that discharges fluid to the high-pressure fluid side by means of relative sliding of the sliding parts is provided on an outside of an area of the one sealing face surrounded by the fluid circulation groove and high-pressure fluid side, and in that the spiral groove communicates with the high-pressure fluid side and is isolated from the low-pressure fluid side by the land.

5. A sliding component according to claim 2, characterized in that a spiral groove that discharges fluid to the high-pressure fluid side by means of relative sliding of the sliding parts is provided on an outside of an area of the one sealing face surrounded by the fluid circulation groove and high-pressure fluid side, and in that the spiral groove communicates with the high-pressure fluid side and low-pressure fluid side.

6. A sliding component according to claim 2, characterized in that a negative-pressure generation mechanism constituted by a negative-pressure generation groove shallower than the fluid circulation groove is provided on an outside of an area of the one sealing face surrounded by the fluid circulation groove and high-pressure fluid side, and in that the negative-pressure generation groove communicates with the inlet and is isolated from the outlet and low-pressure fluid side by the land.

7. A sliding component according to claim 2, characterized in that a spiral groove that discharges fluid to the high-pressure fluid side by means of relative sliding of the sliding parts is provided on the other sealing face of the pair of sliding parts that slide relative to each other, and in that the spiral groove communicates with the high-pressure fluid side and is isolated from the low-pressure fluid side by the land.

8. A sliding component according to claim 2, characterized in that a spiral groove that discharges fluid to the high-pressure fluid side by means of relative sliding of the sliding parts is provided on the other sealing face of the pair of sliding parts that slide relative to each other, and in that the spiral groove communicates with the high-pressure fluid side and low-pressure fluid side.

9. A sliding component according to claim 1, characterized in that the positive-pressure generation mechanism is constituted by a Rayleigh step mechanism.

10. A sliding component according to claim 9, characterized in that a spiral groove that discharges fluid to the high-pressure fluid side by means of relative sliding of the sliding parts is provided on an outside of an area of the one sealing face surrounded by the fluid circulation groove and high-pressure fluid side, and in that the spiral groove communicates with the high-pressure fluid side and is isolated from the low-pressure fluid side by the land.

11. A sliding component according to claim 9, characterized in that a spiral groove that discharges fluid to the high-pressure fluid side by means of relative sliding of the sliding parts is provided on an outside of an area of the one sealing face surrounded by the fluid circulation groove and high-pressure fluid side, and in that the spiral groove communicates with the high-pressure fluid side and low-pressure fluid side.

12. A sliding component according to claim 9, characterized in that a negative-pressure generation mechanism constituted by a negative-pressure generation groove shallower than the fluid circulation groove is provided on an outside of an area of the one sealing face surrounded by the fluid circulation groove and high-pressure fluid side, and in that the negative-pressure generation groove communicates with the inlet and is isolated from the outlet and low-pressure fluid side by the land.

13. A sliding component according to claim 9, characterized in that a spiral groove that discharges fluid to the high-pressure fluid side by means of relative sliding of the sliding parts is provided on the other sealing face of the pair of sliding parts that slide relative to each other, and in that the spiral groove communicates with the high-pressure fluid side and is isolated from the low-pressure fluid side by the land.

14. A sliding component according to claim 1, characterized in that a spiral groove that discharges fluid to the high-pressure fluid side by means of relative sliding of the sliding parts is provided on an outside of an area of the one sealing face surrounded by the fluid circulation groove and high-pressure fluid side, and in that the spiral groove communicates with the high-pressure fluid side and is isolated from the low-pressure fluid side by the land.

15. A sliding component according to claim 1, characterized in that a spiral groove that discharges fluid to the high-pressure fluid side by means of relative sliding of the sliding parts is provided on an outside of an area of the one sealing face surrounded by the fluid circulation groove and high-pressure fluid side, and in that the spiral groove communicates with the high-pressure fluid side and low-pressure fluid side.

16. A sliding component according to claim 1, characterized in that a negative-pressure generation mechanism constituted by a negative-pressure generation groove shallower than the fluid circulation groove is provided on an outside of an area of the one sealing face surrounded by the fluid circulation groove and high-pressure fluid side, and in that the negative-pressure generation groove communicates with the inlet and is isolated from the outlet and low-pressure fluid side by the land.

17. A sliding component according to claim 6, characterized in that the negative-pressure generation mechanism is constituted by a reversed Rayleigh step mechanism.

18. A sliding component according to claim 1, characterized in that a spiral groove that discharges fluid to the high-pressure fluid side by means of relative sliding of the sliding parts is provided on the other sealing face of the pair of sliding parts that slide relative to each other, and in that the spiral groove communicates with the high-pressure fluid side and is isolated from the low-pressure fluid side by the land.

19. A sliding component according to claim 1, characterized in that a spiral groove that discharges fluid to the high-pressure fluid side by means of relative sliding of the sliding parts is provided on the other sealing face of the pair of sliding parts that slide relative to each other, and in that the spiral groove communicates with the high-pressure fluid side and low-pressure fluid side.

20. A sliding component characterized in that: with respect to a pair of sliding parts that slide relative to each other, one sealing face has a fluid circulation groove comprising an inlet through which fluid enters from a high-pressure fluid side, an outlet through which fluid is released to the high-pressure fluid side, and a communicating part through which the inlet and outlet communicate with each other; wherein the fluid circulation groove is isolated from a low-pressure fluid side by a land, a positive-pressure generation mechanism is provided in an area surrounded by the fluid circulation groove and high-pressure fluid side, the positive-pressure generation mechanism communicates with the inlet, a spiral groove that discharges fluid to the high-pressure fluid side by means of relative sliding of the sliding parts is provided on an outside of an area surrounded by the fluid circulation groove and high-pressure fluid side and between the positive-pressure generation mechanism and the outlet and high-pressure fluid side, the spiral groove is isolated from the low-pressure fluid side by a land, and a surface on which the spiral groove is provided is set lower than the land and higher than the positive-pressure generation mechanism.

* * * * *